US012638955B2

(12) United States Patent
Crouch et al.

(10) Patent No.: US 12,638,955 B2
(45) Date of Patent: May 26, 2026

(54) SYSTEMS AND METHODS FOR PROVIDING MODE AWARENESS OF A HUD DISPLAY CONFIGURATION

(71) Applicant: HONEYWELL INTERNATIONAL INC., Charlotte, NC (US)

(72) Inventors: Steven Curtis Crouch, Mesa, AZ (US); Brendan James Fontes, Surprise, AZ (US); Sudarshan Parthasarathy, Bangalore (IN); Vanshikrishna Adhikarla, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 316 days.

(21) Appl. No.: 18/465,586

(22) Filed: Sep. 12, 2023

(65) Prior Publication Data

US 2024/0111394 A1     Apr. 4, 2024

Related U.S. Application Data

(60) Provisional application No. 63/378,199, filed on Oct. 3, 2022.

(51) Int. Cl.
| | |
|---|---|
| *G06F 3/0482* | (2013.01) |
| *B60K 35/23* | (2024.01) |
(Continued)

(52) U.S. Cl.
CPC ............ *G06F 3/0482* (2013.01); *B60K 35/23* (2024.01); *B64D 43/00* (2013.01); *G02B 27/01* (2013.01); *G06F 3/0484* (2013.01)

(58) Field of Classification Search
CPC ...... B64D 43/00; G01C 23/00; G01C 23/005; G08G 5/23; G08G 5/24; B60K 35/23;
(Continued)

(56) References Cited

U.S. PATENT DOCUMENTS

| | | | |
|---|---|---|---|
| 6,112,141 A | 8/2000 | Briffe et al. | |
| 7,191,406 B1 * | 3/2007 | Barber ................... | G01C 23/00 |
| | | | 701/14 |

(Continued)

FOREIGN PATENT DOCUMENTS

| | | | | |
|---|---|---|---|---|
| CN | 110096328 A | * | 8/2019 | ............. G06F 9/451 |
| EP | 3816585 A1 | | 5/2021 | |

OTHER PUBLICATIONS

XP055786454 Parrish Russell Vet al: "Aspects of Synthetic Vision Display Systems and the Best Practices of the NASA's SVS Project", May 1, 2008, pp. 1,18; figures 1,6 *Retrieved from the Internet: URL:https://ntrs.nasa.gov/api/citations/20080018605/downloads/20080018605.pdf?attach ment=true*.

(Continued)

*Primary Examiner* — Nicholas Ulrich
(74) *Attorney, Agent, or Firm* — Ingrassia Fisher & Lorenz LLP

(57) ABSTRACT

Disclosed are methods and systems for determining display modules that are compatible with a display of an avionics system. For instance, a method may include receiving, by one or more processors, a plurality of presets from a database, wherein each of the plurality of presets corresponds to a display unit configuration for an avionics display, analyzing, by the one or more processors, each of the plurality of presets based on one or more constraints, wherein at least one of the one or more constraints includes a Heads-Up Display (HUD) status, based on the analyzing, determining, by the one or more processors, at least one compatible preset of the plurality of presets, and displaying, by the one or more processors, the at least one compatible preset.

12 Claims, 48 Drawing Sheets

200

(51) Int. Cl.
    *B64D 43/00* (2006.01)
    *G02B 27/01* (2006.01)
    *G06F 3/0484* (2022.01)

(58) Field of Classification Search
    CPC ..... B60K 35/213; B60K 35/22; G06F 3/0482;
                    G06F 3/0484; G06F 16/2358
    See application file for complete search history.

(56) References Cited

U.S. PATENT DOCUMENTS

| | | | |
|---|---|---|---|
| 10,854,092 B1 | 12/2020 | Subramaniyan et al. | |
| 11,077,958 B1 * | 8/2021 | Letsu-Dake | G08G 5/21 |
| 2004/0162648 A1 * | 8/2004 | Bontrager | G01C 23/00 |
| | | | 701/3 |
| 2020/0183491 A1 * | 6/2020 | Manjon Sanchez | |
| | | | G02B 27/0149 |

OTHER PUBLICATIONS

XP093136005 Garmin International: "Flight Deck Solutions, Tech-
nologies and Services", Jul. 13, 2021, pp. 1-17, Retrieved from the
Internet: URL:https://www8.garmin.com/aviation/broch ures/721_
Flight_Deck_STS.pdf.

* cited by examiner

Figure 2:
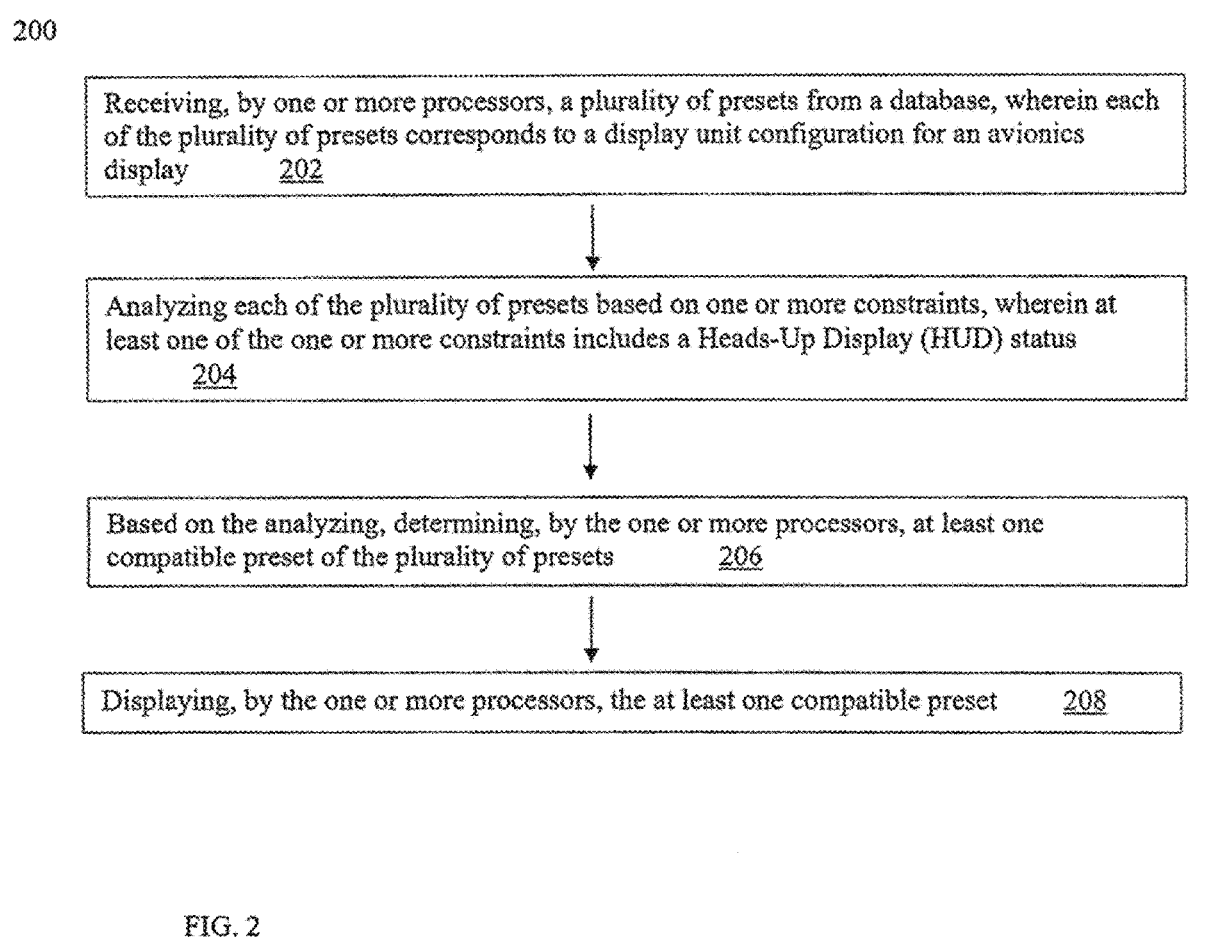

200

Receiving, by one or more processors, a plurality of presets from a database, wherein each of the plurality of presets corresponds to a display unit configuration for an avionics display        202

Analyzing each of the plurality of presets based on one or more constraints, wherein at least one of the one or more constraints includes a Heads-Up Display (HUD) status        204

Based on the analyzing, determining, by the one or more processors, at least one compatible preset of the plurality of presets        206

Displaying, by the one or more processors, the at least one compatible preset        208

Figure 3:
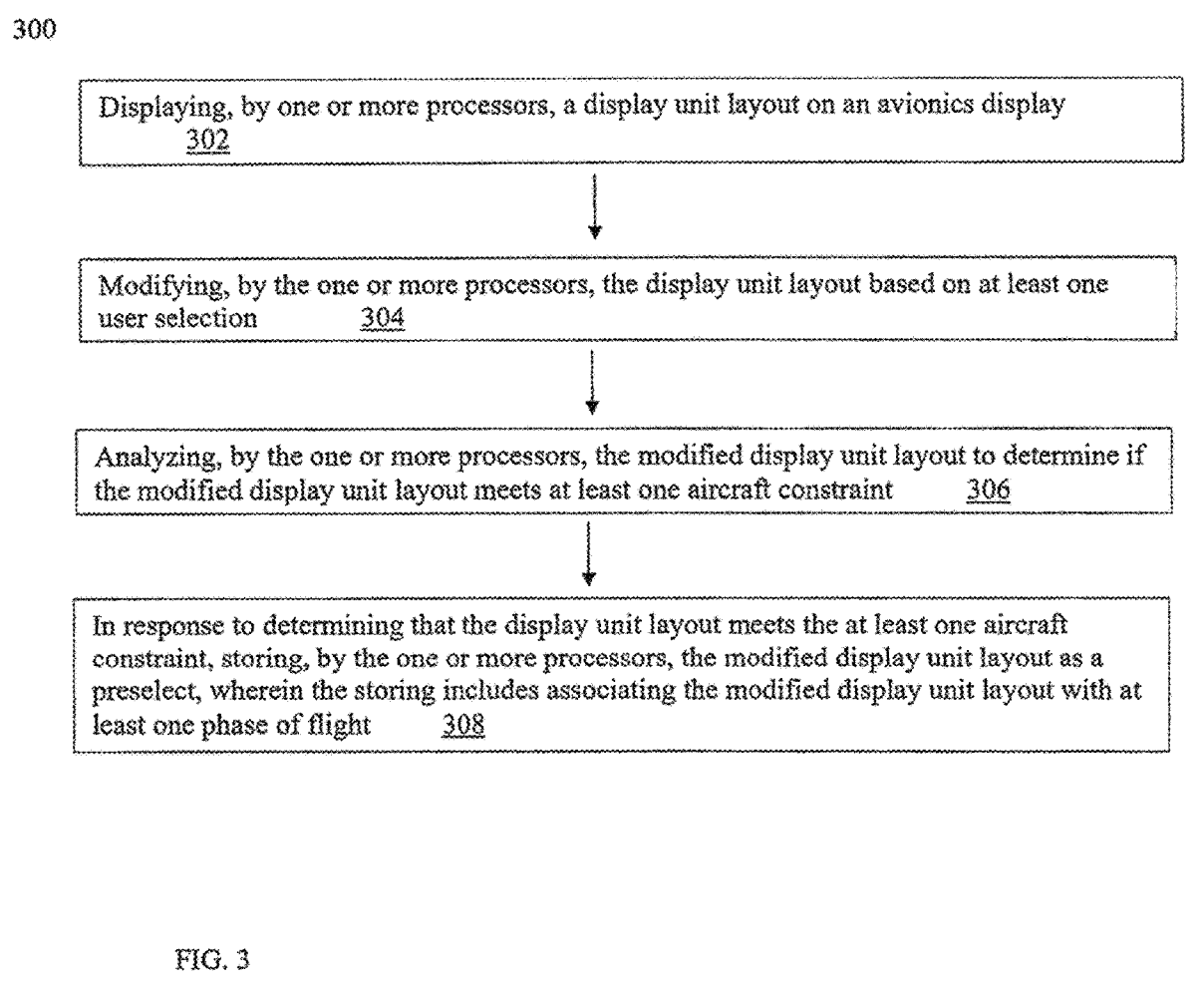

> Displaying, by one or more processors, a display unit layout on an avionics display
> 302

↓

> Modifying, by the one or more processors, the display unit layout based on at least one user selection     304

↓

> Analyzing, by the one or more processors, the modified display unit layout to determine if the modified display unit layout meets at least one aircraft constraint     306

↓

> In response to determining that the display unit layout meets the at least one aircraft constraint, storing, by the one or more processors, the modified display unit layout as a preselect, wherein the storing includes associating the modified display unit layout with at least one phase of flight     308

| VHF 1 🎤 | ⓧ | Xpdr 1 | R | 🔔 | VHF 2 🎤 | 🔊 |
|---|---|---|---|---|---|---|
| 120.700 | | 3271 | | | 121.600 | |
| Phoenix App | | TA/RA | | | KFFZ Ground | |

Add Custom Preset ✕

Preset Name

Custom 1|

HUD Open

HUD Stowed

CAS

CAS

| | |
|---|---|
| | ⌫ |

| 1 | 2 | 3 | 4 | 5 | 6 | 7 | 8 | 9 | 0 |
|---|---|---|---|---|---|---|---|---|---|
| Q | W | E | R | T | Y | U | I | O | P |

| A | S | D | F | G | H | J | K | L |
|---|---|---|---|---|---|---|---|---|

| Z | X | C | V | B | N | M | / |
|---|---|---|---|---|---|---|---|

| 🖥 | ○ 123 ⊙ ABC | . | _\+ | Space | Enter |
|---|---|---|---|---|---|

VHF · HF

🎤 1 2 3 1 2
🔊 1 1 2 3 1 2

SAT

ATC Datalink
KPHX

VHF 1 🎤 ⊠
120.700
Phoenix App

Xpdr 1 R
3271
TA/RA

🔔

VHF 2 🎤 🔊
121.600
KFFZ Ground

Add Custom Preset ✕

Preset Name
TOP GUN

HUD
Open

HUD
Stowed

| CHARTS | CAS |
| | ATC |

| INAV | WPT |

| CAS | IPFD |
| ENG | |

| FMW | C/L |
| SYNOP | |

Cancel

Save

⊠

500

| | | VHF HF | SAT | ATC Datalink |
|---|---|---|---|---|

VHF 1 🎤    🔇
120.700
Phoenix App

Xpdr 1     R
3271
TA/RA

🔔

VHF 2 🎤    🔊
121.600
KFFZ Ground

Display Phase of Flight

HUD
Open

HUD
Stowed

| | CAS |
|---|---|
| CHARTS | |
| | ATC |

| | |
|---|---|
| INAV | WPT |

| CAS | OPS |
|---|---|
| C/L | SYNOP |

Parking Brake
On

| FMW | |
|---|---|
| | C/L |
| SYNOP | |

| Aircraft Presets | Custom Presets |
|---|---|

| TOP GUN | Add Custom Preset |
|---|---|

✓ Custom Preset Saved

| | ⌫ |
|---|---|

Figure 27:
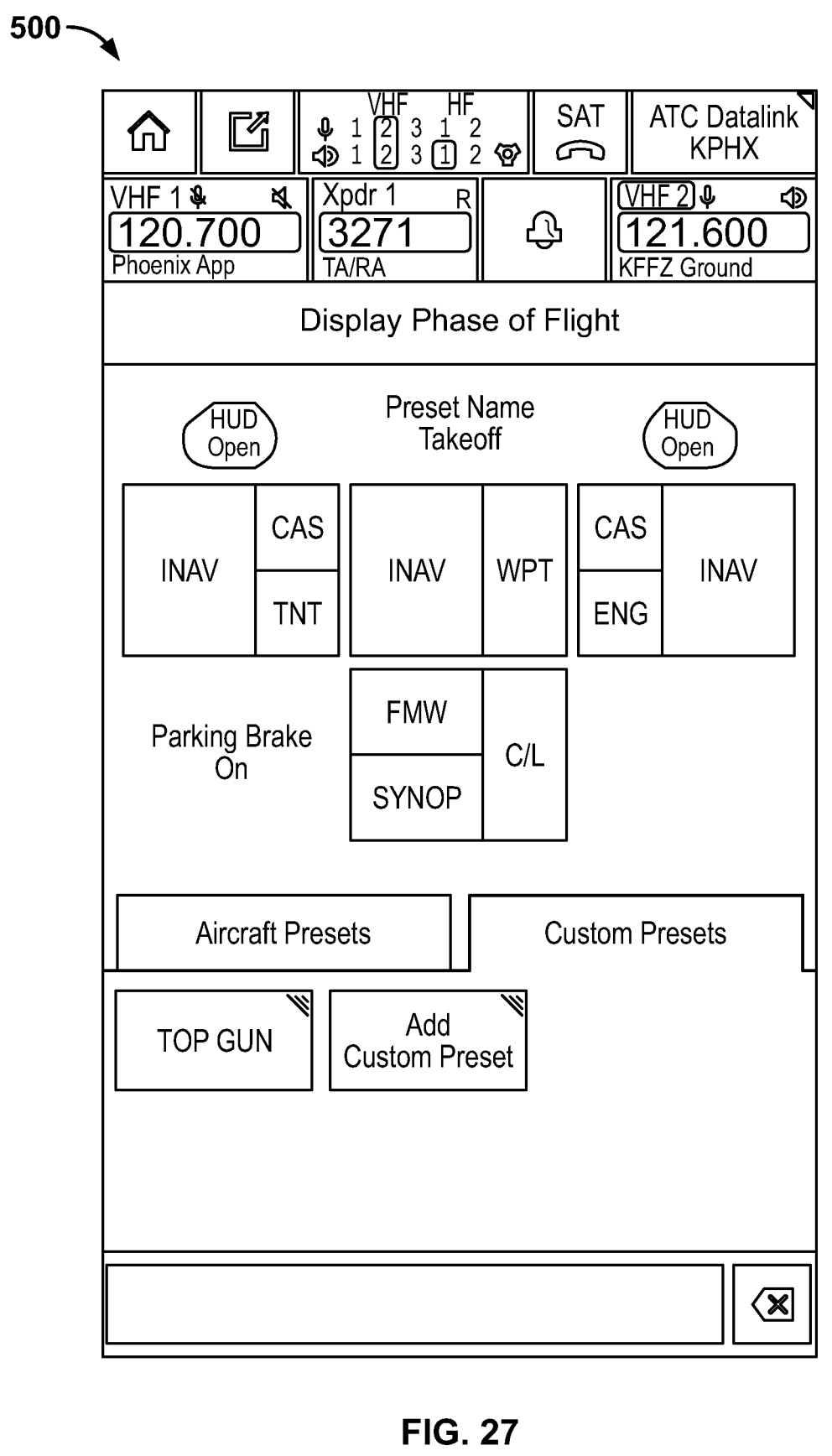

VHF  HF

🎙 1  2  3  1  2  🔔
🔊 1  2  3  1  2

SAT  📞

ATC Datalink
KPHX

VHF 1 🎙        🔇
120.700
Phoenix App

Xpdr 1      R
3271
TA/RA

🔔

VHF 2 🎙       🔊
121.600
KFFZ Ground

Display Phase of Flight

Preset Name
Takeoff

HUD
Open

HUD
Open

| INAV | CAS |
| | TNT |

| INAV | WPT |

| CAS | INAV |
| ENG | |

Parking Brake
On

| FMW | C/L |
| SYNOP | |

Aircraft Presets

Custom Presets

TOP GUN

Add
Custom Preset

Figure 31:
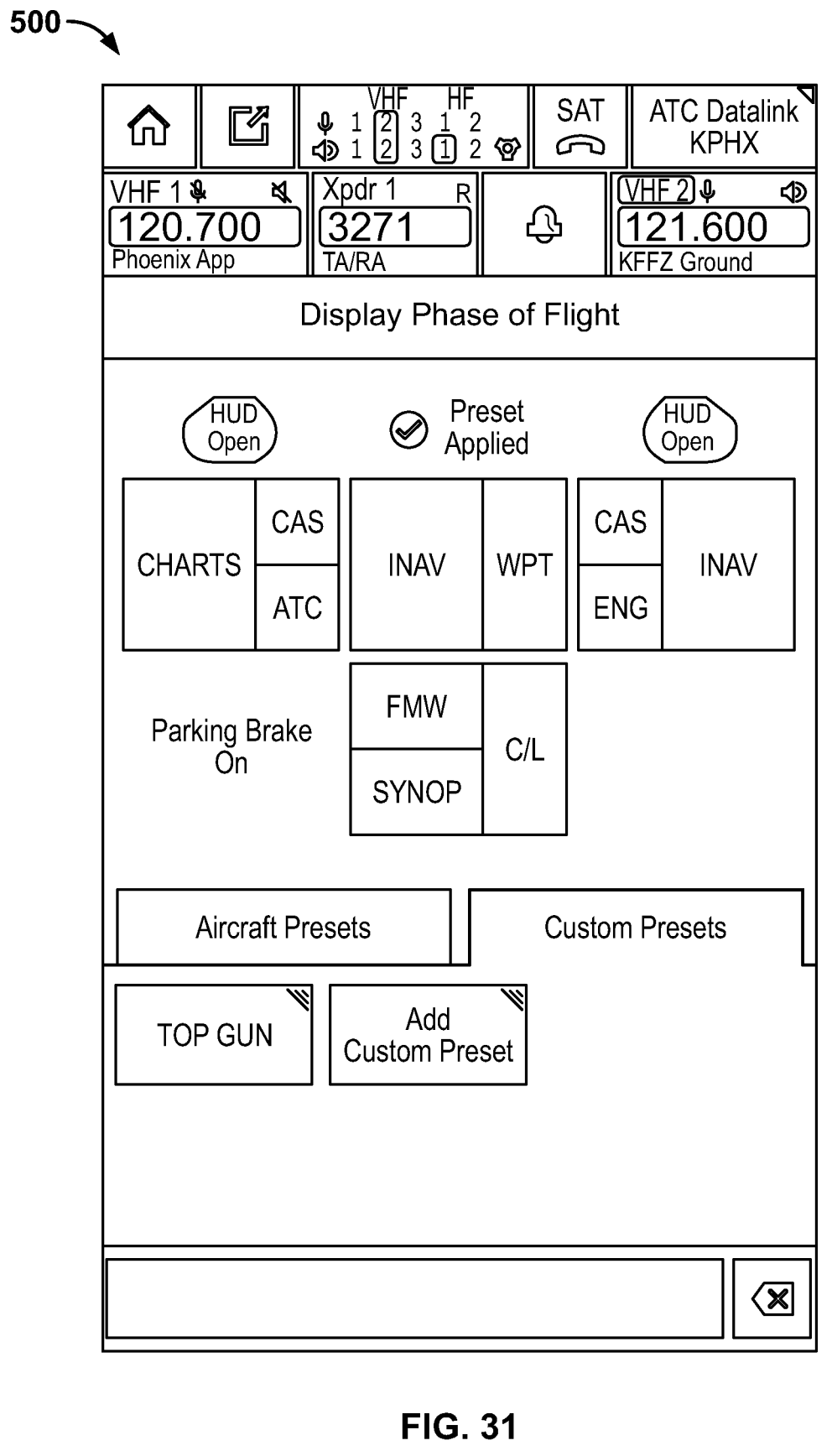

VHF   HF

🎤 1 2️⃣ 3 1 2

🔊 1 2️⃣ 3 1️⃣ 2

SAT

ATC Datalink
KPHX

VHF 1 🎤   🔇
120.700
Phoenix App

Xpdr 1   R
3271
TA/RA

🔔

VHF 2 🎤   🔊
121.600
KFFZ Ground

Display Phase of Flight

HUD
Open

✅ Preset
Applied

HUD
Open

CHARTS | CAS
| ATC

INAV | WPT

CAS | INAV
ENG |

Parking Brake
On

FMW
SYNOP | C/L

| Aircraft Presets | Custom Presets |

TOP GUN

Add
Custom Preset

Figure 35:
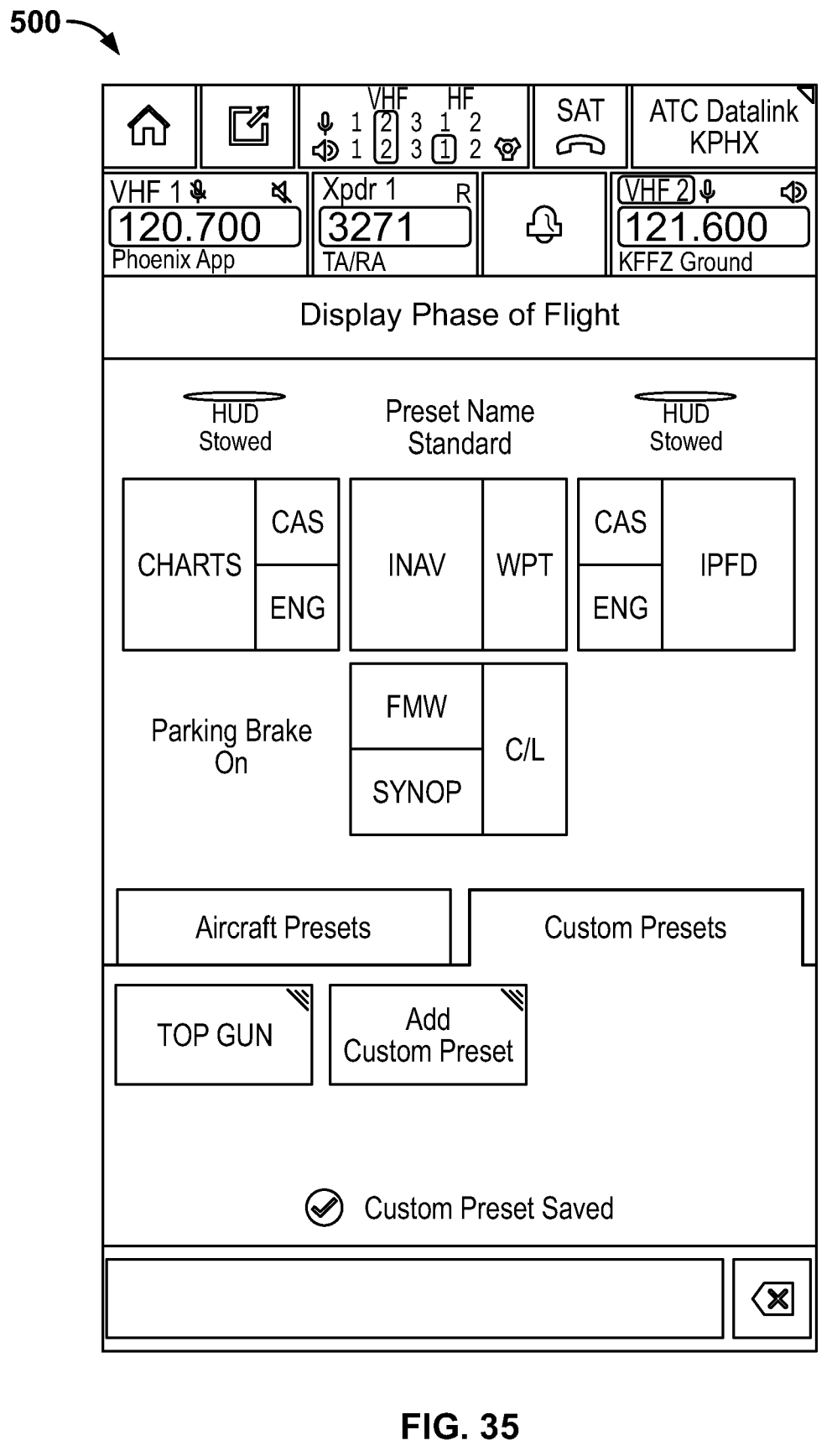

VHF    HF

🏠    📤    🎤 1 [2] 3 1 2    SAT    ATC Datalink
    🔊 1 [2] 3 [1] 2 2 🔔    ☎    KPHX VHF 1 🎤     🔇    | Xpdr 1    R        🔔      VHF 2 🎤    🔊
120.700    | 3271              121.600
Phoenix App     | TA/RA               KFFZ Ground Display Phase of Flight ⊖ HUD        Preset Name        ⊖ HUD
Stowed          Standard           Stowed

| | CAS | | | | CAS | |
| CHARTS | --- | | INAV | WPT | --- | IPFD |
| | ENG | | | | ENG | |

Parking Brake     | FMW | |
On          | --- | C/L |
             | SYNOP | |

| Aircraft Presets | Custom Presets |

| TOP GUN | Add Custom Preset |

✓ Custom Preset Saved

Figure 39:
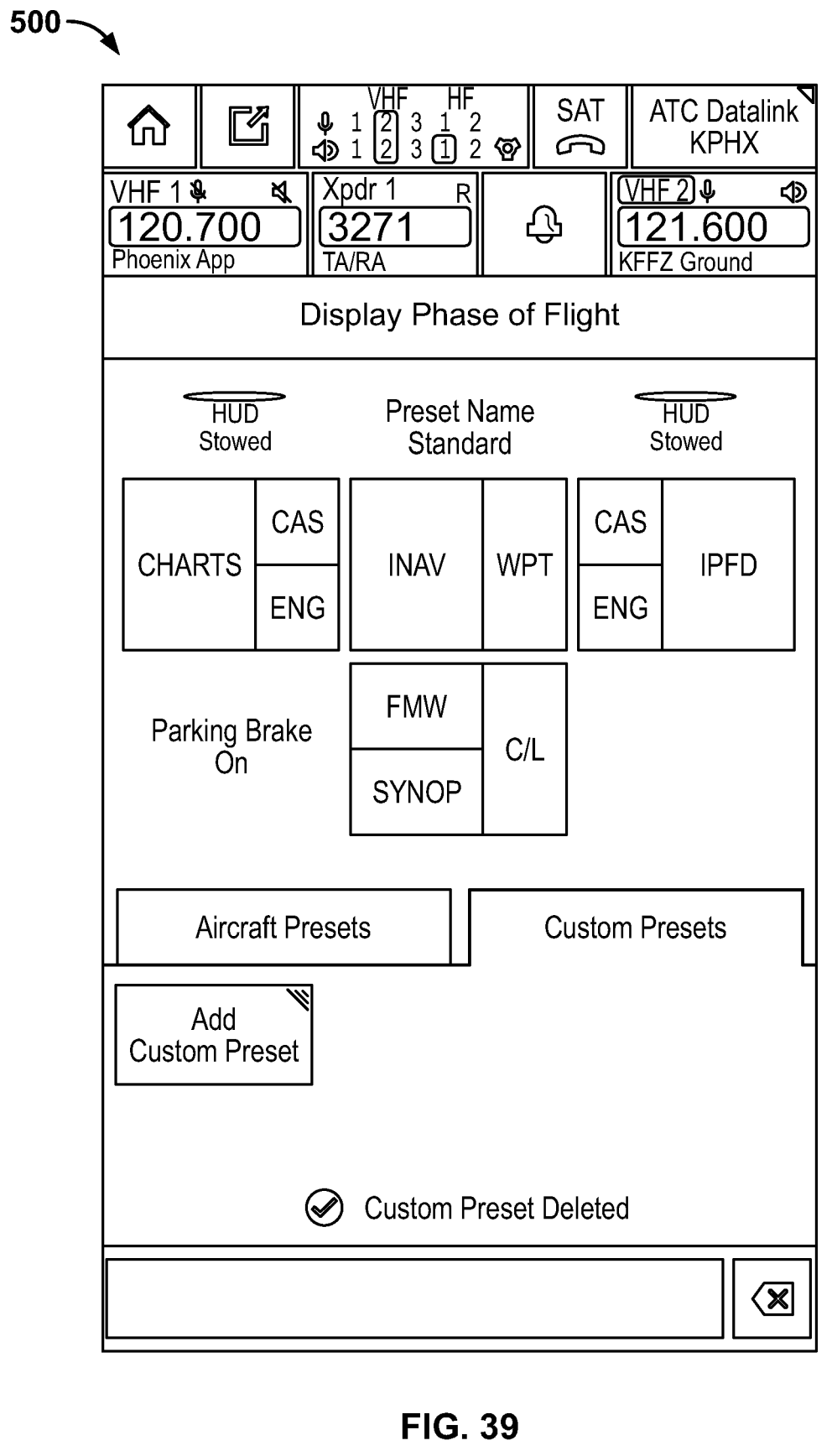

VHF    HF

🎤 1 2 3 1 2
🔊 1 2 3 1 2 🐭

SAT

ATC Datalink
KPHX

VHF 1 🎤    🔇
120.700
Phoenix App

Xpdr 1    R
3271
TA/RA

🔔

VHF 2 🎤    🔊
121.600
KFFZ Ground

Display Phase of Flight

HUD
Stowed

Preset Name
Standard

HUD
Stowed

| CHARTS | CAS |
| | ENG |

| INAV | WPT |

| CAS | IPFD |
| ENG | |

Parking Brake
On

| FMW | C/L |
| SYNOP | |

| Aircraft Presets | Custom Presets |

Add
Custom Preset

✓ Custom Preset Deleted

| VHF   HF | SAT | ATC Datalink KPHX |
|---|---|---|
| 🎤 1 ②3 1 2 | ☎ | |
| 🔊 1 ②3 ③ 2 🕸 | | |

| VHF 1 🎤   🔇 | Xpdr 1   R | 🔔 | VHF 2 🎤   🔊 |
|---|---|---|---|
| 120.700 | 3271 | | 121.600 |
| Phoenix App | TA/RA | | KFFZ Ground |

Display Phase of Flight

HUD
Stowed

Preset Name
Standard

HUD
Stowed

| IPFD | CAS |
|---|---|
| | ENG |

| INAV | WPT |
|---|---|

ⓘ
AGM or DU
Unavailable

502

Parking Brake
On

| FMW | |
|---|---|
| SYNOP | C/L |

| Aircraft Presets | Custom Presets |
|---|---|

| Standard | Init ✈ | Start ✈ | Taxi ✈ |
|---|---|---|---|
| Takeoff ✈ | Cruise ✈ | Descent ✈ | Approach ✈ |

⊗

500

| VHF | HF | | |
|---|---|---|---|
| 🏠 | 📤 | 🎤 1 ②3 1 2 / 🔊 1 ②3 ① 2 ⊙ | SAT ☎ | ATC Datalink KPHX |

| VHF 1 🎤 🔇 | Xpdr 1   R | | VHF 2 🎤 🔊 |
|---|---|---|---|
| 120.700 | 3271 | 🔔 | 121.600 |
| Phoenix App | TA/RA | | KFFZ Ground |

Display Phase of Flight

HUD
Stowed

Preset Name
Standard

HUD
Stowed

| IPFD | CAS |
| | ENG |

| INAV | WPT |

AGM or DU
Fail

← 502

Parking Brake
On

| FMW | |
| SYNOP | C/L |

| Aircraft Presets | Custom Presets |

| Standard | Init ✈ | Start ✈ | Taxi ✈ |
|---|---|---|---|
| Takeoff ✈ | Cruise ✈ | Descent ✈ | Approach ✈ |

| | ⌫ |

Figure 48:
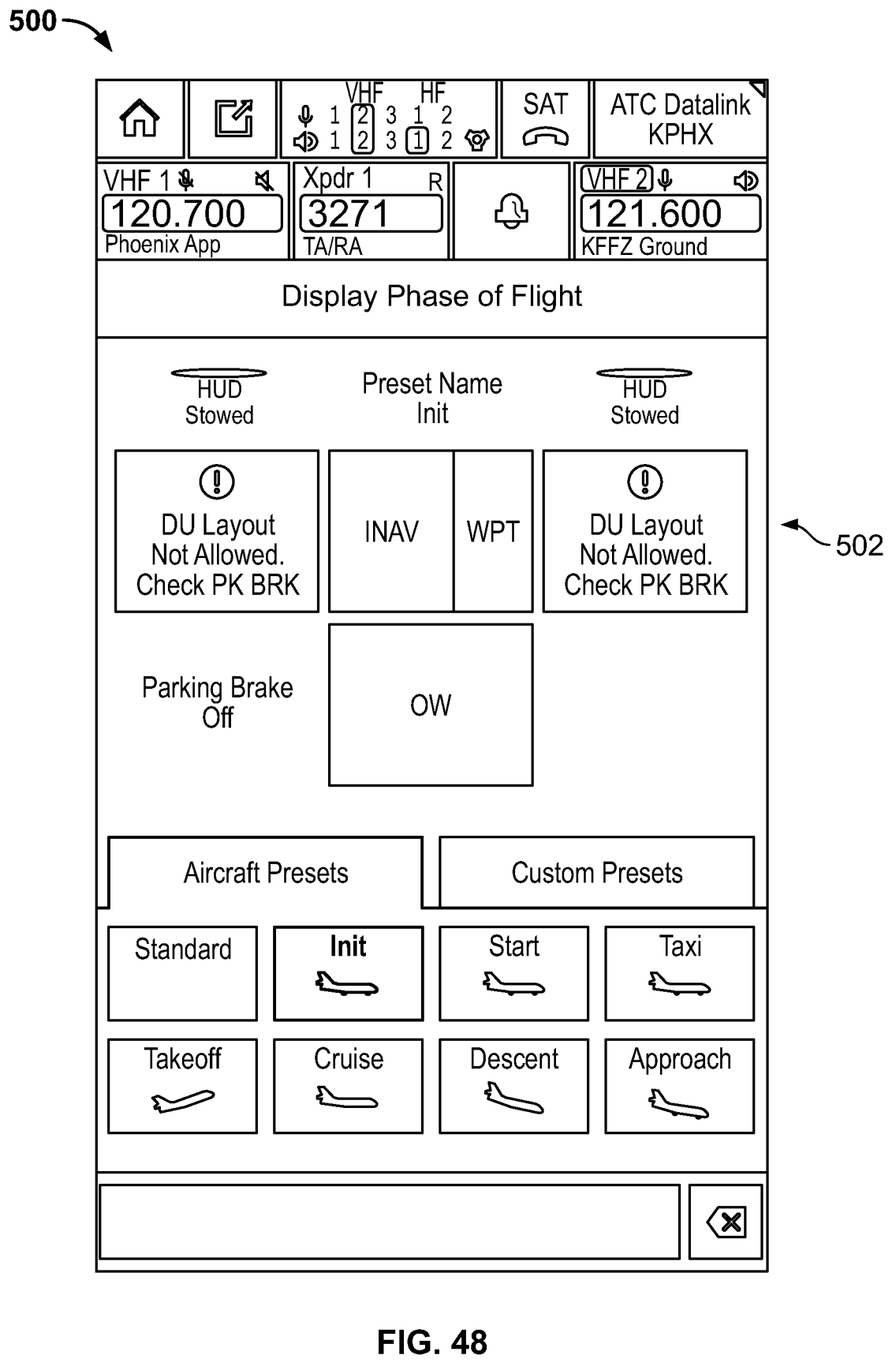

500

502

Display Phase of Flight

HUD
Stowed

Preset Name
Init

HUD
Stowed

⚠
DU Layout
Not Allowed.
Check PK BRK

INAV     WPT

⚠
DU Layout
Not Allowed.
Check PK BRK

Parking Brake
Off

OW

VHF 1 🎤          🔇
120.700
Phoenix App

Xpdr 1      R
3271
TA/RA

🔔

VHF 2 🎤          🔊
121.600
KFFZ Ground

VHF    HF
🎤  1 2 3 1 2
🔊 1 2 3 1 2 ⚙

SAT
☎

ATC Datalink
KPHX

🏠   ↗

Aircraft Presets

Custom Presets

Standard

Init
✈

Start
✈

Taxi
✈

Takeoff
✈

Cruise
✈

Descent
✈

Approach
✈

SYSTEMS AND METHODS FOR PROVIDING MODE AWARENESS OF A HUD DISPLAY CONFIGURATION

CROSS-REFERENCE TO RELATED APPLICATION

The present application claims benefit of prior filed U.S. Provisional Patent Application No. 63/378,199, filed Oct. 3, 2022, which is hereby incorporated by reference herein in its entirety.

TECHNICAL FIELD

Various embodiments of the present disclosure relate generally to determining display unit layouts that are compatible with a display of an avionics system and, more particularly, to systems and methods for determining display unit layouts that are compatible with a display of an avionics system.

BACKGROUND

As modern aviation continues to evolve, aircraft flight deck graphical user interfaces continue to require more software applications to handle different functions throughout the phases of flight. Flight crews and Single Pilot Operators (SPO) may desire the ability to use all available display units in a flight deck to display as much available software as they can, while relying solely on a Heads-Up-Display (HUD) as the sole means of aviating the aircraft and replacing all instances of a Primary Flight Display (PFD) on the display units. However, under current approaches, flight crews and SPO's may not be alerted in real-time regarding whether layouts of available software may be displayed properly on a HUD.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for determining display unit layouts that are compatible with a display of an avionics system.

In one aspect, an exemplary embodiment of a method for determining display modules that are compatible with a display of an avionics system is disclosed. The method may include receiving, by one or more processors, a plurality of presets from a database, wherein each of the plurality of presets corresponds to a display unit configuration for an avionics display. The method may further include analyzing, by the one or more processors, each of the plurality of presets based on one or more constraints, wherein at least one of the one or more constraints includes a Heads-Up Display (HUD) status. The method may further include, based on the analyzing, determining, by the one or more processors, at least one compatible preset of the plurality of presets. The method may further include displaying, by the one or more processors, the at least one compatible preset.

In one aspect, a computer system for determining display modules that are compatible with a display of an avionics system is disclosed. The computer system may include a memory having processor-readable instructions stored therein, and one or more processors configured to access the memory and execute the processor-readable instructions, which when executed by the one or more processors configures the one or more processors to perform a plurality of functions. The functions may include receiving a plurality of presets from a database, wherein each of the plurality of presets corresponds to a display unit configuration for an avionics display. The functions may further include analyzing each of the plurality of presets based on one or more constraints, wherein at least one of the one or more constraints includes a Heads-Up Display (HUD) status. The functions may further include, based on the analyzing, determining at least one compatible preset of the plurality of presets. The functions may further include displaying the at least one compatible preset.

In one aspect, a non-transitory computer-readable medium containing instructions for determining display modules that are compatible with a display of an avionics system is disclosed. The instructions may include receiving a plurality of presets from a database, wherein each of the plurality of presets corresponds to a display unit configuration for an avionics display. The instructions may further include analyzing each of the plurality of presets based on one or more constraints, wherein at least one of the one or more constraints includes a Heads-Up Display (HUD) status. The instructions may further include, based on the analyzing, determining at least one compatible preset of the plurality of presets. The instructions may further include displaying the at least one compatible preset.

In one aspect, an exemplary embodiment of a method for determining display modules that are compatible with an avionics system is disclosed. The method may include displaying, by one or more processors, a display unit layout on an avionics display. The method may further include modifying, by the one or more processors, the display unit layout based on at least one user selection. The method may further include analyzing, by the one or more processors, the modified display unit layout to determine if the modified display unit layout meets at least one aircraft constraint. The method may further include, in response to determining that the display unit layout meets the at least one aircraft constraint, storing, by the one or more processors, the modified display unit layout as a preselect, wherein the storing includes associating the modified display unit layout with at least one phase of flight.

In one aspect, a computer system for determining display modules that are compatible with an avionics system is disclosed. The computer system may include a memory having processor-readable instructions stored therein, and one or more processors configured to access the memory and execute the processor-readable instructions, which when executed by the one or more processors configures the one or more processors to perform a plurality of functions. The functions may include displaying a display unit layout on an avionics display. The functions may further include modifying the display unit layout based on at least one user selection. The functions may further include modifying the display unit layout based on at least one user selection. The functions may further include analyzing the modified display unit layout to determine if the modified display unit layout meets at least one aircraft constraint. The functions may further include, in response to determining that the display unit layout meets the at least one aircraft constraint, storing the modified display unit layout as a preselect, wherein the storing includes associating the modified display unit layout with at least one phase of flight.

In one aspect, a non-transitory computer-readable medium containing instructions for determining display modules that are compatible with an avionics system is disclosed. The instructions may include displaying a display unit layout on an avionics display. The instructions may further include modifying the display unit layout based on at least one user selection. The instructions may further include analyzing the modified display unit layout to determine if the modified display unit layout meets at least one aircraft constraint. The instructions may further include, in response to determining that the display unit layout meets the at least one aircraft constraint, storing the modified display unit layout as a preselect, wherein the storing includes associating the modified display unit layout with at least one phase of flight.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart for determining display unit layouts that are compatible with an avionics system, according to one or more embodiments.

FIG. 3 depicts a flowchart of an exemplary method for modifying display unit layouts that are compatible with aircraft constraints, according to one or more embodiments.

FIGS. 5-48 depict example images that may be rendered on one or more display unit(s) by the system of FIG. 4.

DETAILED DESCRIPTION OF EMBODIMENTS

Figure 1:
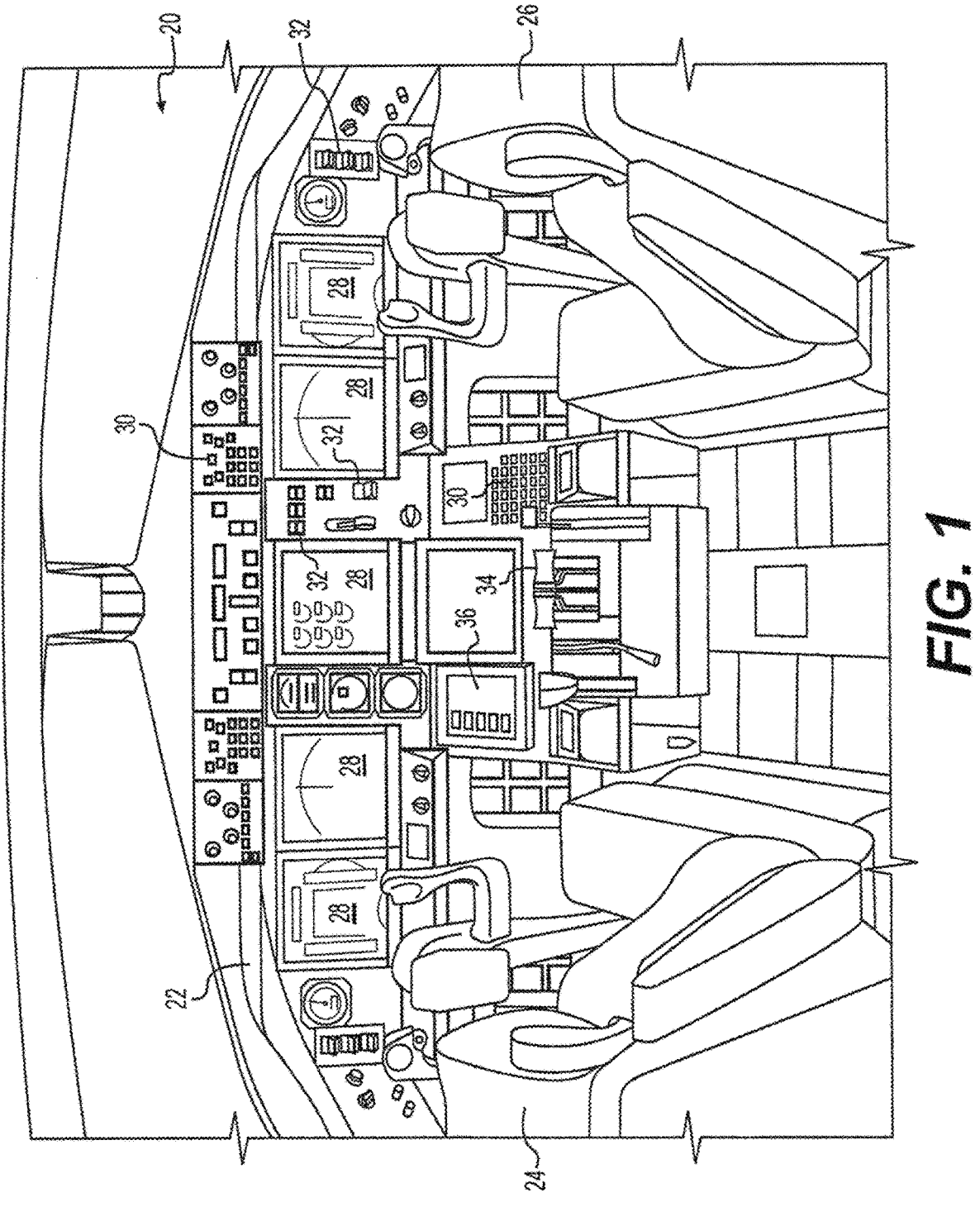
FIG. 1 depicts an exemplary system environment that may be utilized with techniques presented herein, according to one or more embodiments.

According to certain aspects of the disclosure, methods and systems are disclosed for determining display unit layouts that are compatible with an avionics system. Additionally, methods and systems are disclosed for modifying display unit layouts and ensuring that such modifications are compatible with aircraft constraints. Conventional techniques may not be suitable because conventional techniques may not allow for the real-time analysis of whether display unit layouts are compatible with different displays of an avionics system. Additionally, conventional techniques may not allow for users to modify display unit layouts and receive a real-time analysis of whether the modified display unit layout may be compatible with the avionics system display. Accordingly, improvements in technology relating to determining whether display unit layouts, including customized display unit layouts, are compatible with an avionics system display are needed.

As modern aviation continues to evolve, aircraft flight deck graphical user interfaces continue to require more software applications to handle different functions throughout the phases of flight during a mission. Flight crews and Single Pilot Operators (SPO) may desire to use all available display units in a flight deck to display as much of the available software as they can, while relying solely on a Heads-Up Display (HUD) as the sole means of aviating the aircraft and replacing all instances of a Primary Flight Display (PFD) on the display units. However, due to regulatory policies, a PFD or backup Attitude Direction Indicator (ADI) may be required during flight operations. As such, the aircraft may need to provide awareness to a flight crew or SPO when they have selected or defined a display configuration that conflicts with the current HUD status and/or parking brake status in combination with using the HUD as the sole display means during specific phases of flight.

This disclosure provides systems and methods to display the current HUD status and/or parking brake status relative to the currently selected window software application layouts on various display unit configurations. These application layouts can be defined, saved, and later applied by the flight crew and/or SPO, providing them customizable flight deck graphical layouts based on personal preferences for operating an aircraft. This disclosure also provides systems and methods for customizable abilities and may ensure that the flight crew and/or SPO may be aware when a selected configuration cannot be used based on the current HUD status and/or parking brake status.

Advantages of such systems and methods may include providing real-time mode awareness to flight crews and/or pilots. For example, the flight crews and/or pilots may be made aware of a mismatch between a current HUD status and/or parking brake status relative to an allowable display unit layout configuration. Such a situation may occur when a HUD is being used as the sole means to aviate an aircraft when no PFD is actively being used on a display unit.

Additionally advantages may include reducing the cognitive workload for pilots because pilots may be able to quickly and easily see the current status and display unit, HUD, and/or parking brake configurations. Additionally, pilots may be able to efficiently change the configurations to be compliant with particular requirements/constraints.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

While this disclosure describes the systems and methods with reference to securely deploying obfuscated modules in an external system, it should be appreciated that the present systems and methods are applicable to securely deploying obfuscated modules in an internal system or any other system.

Exemplary System Environment

As shown in FIG. 1, an exemplary system environment for an electronic checklist is depicted, according to one or more embodiments. Specifically, FIG. 1 is a fragmentary perspective view illustrating the inside of an exemplary aircraft cockpit 20. Although the context of the following discussion is with respect to GUIs of displays used in aircraft, it should be understood that the teachings herein pertain to displays used in any type of vehicle including, but not limited to, land based vehicles such as automobiles and trains as well as watercraft and spacecraft. Additionally, the teachings herein are not limited to vehicle applications. Rather, the teachings herein may also be used together with displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control display 36. Moreover, the front displays 28 may also be displays.

One of the front displays 28 or the control display 36 (called herein "vehicle manager screen") may be configured to operate as a vehicle manager that may display interactive electronic checklists and/or navigation or other vehicle system data. Specifically, a processor may execute a vehicle manager program (comprised of instructions executable by the processor) that causes the vehicle manager screen to display a vehicle manager display.

The processor may cause the vehicle manager screen to display the vehicle manager display by generating images and transmitting the images to the vehicle manager screen to be displayed. Alternatively, the processor may generate instructions and information and transmit the instructions and information to a graphics processing unit (GPU). The GPU may generate the images to be displayed on the vehicle manager screen. The vehicle manager program may be stored in a memory. The memory may be connected to the processor so that the processor may receive stored instructions or data, and the processor may process the instructions, stored data, and received information, in accordance with the vehicle manager program. The memory and the processor may be connected to the vehicle manager screen either directly or indirectly. Collectively the memory, the processor, and the vehicle manager screen may be referred to as a "vehicle manager system." In one embodiment, the vehicle manager system may be an electronic procedure system of a vehicle.

For instance, the vehicle manager program may control a functionality and configuration of the vehicle manager screen, in accordance with a loadable checklist control file (called herein a "loadable database"), e.g., received from a cloud service. The vehicle manager program may store the loadable database in the memory. The vehicle manager program may control the configuration of the vehicle manager screen, based on user inputs to the system, data from other vehicle systems, and/or FMS data from, e.g., a cloud FMS. Specifically, the vehicle manager program may display the vehicle manager display to depict an electronic checklist in accordance with the loadable database, and receive user inputs to view and/or to change the configuration of the vehicle manager screen.

Generally, user inputs may be a touch interaction with the vehicle manager screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, in accordance with the vehicle manager program.

Exemplary Method for Determining Compatible Display Unit Layouts

FIG. 2 illustrates an exemplary method 200 for determining display unit layouts that are compatible with a display of an avionics system, according to one or more embodiments. Notably, method 200 may be performed by one or more processors of a server that is in communication with one or more user devices and other external system(s) via a network. However, it should be noted that method 200 may be performed by any one or more of the server, one or more user devices, or other external systems.

The method may include receiving, by one or more processors, a plurality of presets from a database, wherein each of the plurality of presets corresponds to a display unit configuration for an avionics display (Step 202). The database may be part of an avionics system of an aircraft. For example, the plurality of presets may have been preloaded to the database by a user and/or an external system. In some embodiments, the database may be part of an external system (e.g., a cloud computing system). The plurality of presets may correspond to a display unit configuration for an avionics display. For example, the presets may provide specific software application layouts and display unit configurations to aid flight crew and/or pilot operators through various phases of flight during flight operations. The plurality of presets may correspond to at least one phase of flight category, wherein the at least one phase of flight category includes a standard category, an initial category, a start category, a taxi category, a takeoff category, a cruise category, a descent category, an approach category, a departure category, or an arrival category. For example, the avionics system may display the flight categories, where if the user selects a flight category, one or more of the presets may be displayed on the avionics display.

The method may include analyzing, by the one or more processors, each of the plurality of presets based on one or more constraints, wherein at least one of the one or more constraints includes a Heads-Up Display (HUD) status (Step 204). The analyzing may include comparing each of the presets with each of the constraints. The HUD status may indicate whether the HUD has been stowed or if the HUD is open. The one or more constraints may include at least one of: a regulatory constraint, a location constraint, an internal constraint, a system constraint, a parking brake constraint, or a Weight on Wheels (WOW) constraint. The regulatory constraint may correspond to one or more constraints (e.g., rules) of a regulatory organization (e.g., the FAA). The location constraint may correspond to one or more constraints of one or more locations (e.g., airspace) that the aircraft may fly from, to, and/or through. The internal constraint may correspond to one or more constraints of the organization and/or users associated with the aircraft. The system constraint may correspond to one or more constraints of the aircraft system (e.g., display availability). The parking brake constraint may correspond to at least one status of the aircraft's parking brake. The WOW constraint may correspond to a parameter for system logic. Additional constraints may include one or more constraints corresponding to the qualifications and/or certification levels of one or more pilots and/or flight crew of the aircraft, the wheel spin (rpm), aircraft velocity, augmented lift devices and their positions or states, such as Slats and Flaps position, whether the engine is running or has started, engine and/or propeller RPMs, engine ratio of thrust or power, the aircraft's alignment with the takeoff runway, the aircraft's proximity to the takeoff runway, communication to a tower on a towered airport, communication on the Common Traffic Advisory Frequency (CTAF) and/or Unicom frequency at an untowered airport, and/or whether a passenger door is closed.

The method may include, based on the analyzing, determining, by the one or more processors, at least one compatible preset of the plurality of presets (Step 206). For example, based on comparing each of the presets with each of the constraints, the method may determine at least one compatible preset that complies with the one or more constraints. For example, the compatible presets may be dependent upon whether the HUD has been stowed or the HUD is open.

The method may include displaying, by the one or more processors, the at least one compatible preset (Step 206). For example, the compatible preset may be displayed directly on one or more user interfaces of the avionics system. Additionally, the at least one compatible preset may be stored in the database for future use.

In some embodiments, the method may include receiving, by the one or more processors, a user selection of the at least one compatible preset from a user. The method may further include analyzing, by the one or more processors, the at least one compatible preset based on one or more updated constraints. For example, the updated constraints may be received before and/or during a flight. The updated constraints may include at least one constraint that is different from the original one or more constraints. The method may include, based on the analyzing, determining, by the one or more processors, that the at least one compatible preset is not compatible with the one or more updated constraints. The method may also include displaying a notification indicating that the at least one compatible preset is not compatible with the updated constraints. The method may include providing, by the one or more processors, a recommended preset to the user, where the recommended preset may be compatible with the one or more updated constraints. In some embodiments, the user may be able to indicate whether the recommended preset should be display on the avionics system.

Although FIG. 2 shows example blocks of exemplary process 200, in some implementations, the exemplary process 200 may include additional blocks, fewer blocks, different blocks, or differently arranged blocks than those depicted in FIG. 2. Additionally, or alternatively, two or more of the blocks of the exemplary process 200 may be performed in parallel.

Exemplary Method for Modifying Display Unit Layouts

FIG. 3 illustrates an exemplary method 300 for modifying display unit layouts that are compatible with aircraft constraints, according to one or more embodiments. Notably, method 300 may be performed by one or more processors of a server that is in communication with one or more user devices and other external system(s) via a network. However, it should be noted that method 300 may be performed by any one or more of the server, one or more user devices, or other external systems.

The method may include displaying, by one or more processors, a display unit layout on an avionics display (Step 302). For example, the display unit layout may correspond to one or more software applications that handle different functions throughout one or more phases of flight. The display unit layout may be displayed in a list format, where one or more phases of flight may be displayed. Additionally, each of the one or more phases of flight may include at least one display unit layout.

The method may include modifying, by the one or more processors, the display unit layout based on at least one user selection (Step 304). For example, the at least one user selection may include adding, removing, and/or moving the display of at least one of the software applications. The user may modify the display unit layout by interacting with the display.

The method may include analyzing, by the one or more processors, the modified display unit layout to determine if the modified display unit layout meets at least one aircraft constraint (Step 306). The analyzing may include comparing the modified display unit layout to the at least one aircraft constraint. The at least one aircraft constraint may correspond to one or more aircraft requirements/limitations (e.g., aircraft size, vehicle type), as well as one or more aircraft system requirements/limitations (e.g., number of displays, type of displays).

The method may include, in response to determining that the display unit layout meets the at least one aircraft constraint, storing, by the one or more processors, the modified display unit layout as a preselect, wherein the storing includes associating the modified display unit layout with at least one phase of flight (Step 308). The at least one phase of flight may include a standard category, an initial category, a start category, a taxi category, a takeoff category, a cruise category, a descent category, or an approach category. The method may include analyzing the modified display unit layout to determine at least one corresponding phase of flight.

In some embodiments, the storing may include creating, by the one or more processors, a database record that associates a user with the modified display unit layout. For example, the database record may include a unique user identifier associated with the user. The method may include storing, by the one or more processors, the database record in a database for access by one or more additional avionics systems. For example, the database may be a part of a cloud computing system, where the user may be able to access the modified display unit layout from one or more additional avionics systems (e.g., other aircraft, mobile devices). Additionally, in some embodiments, the database record may be downloaded onto one or more user devices, where the user may access the modified display unit layout without connecting to an avionics system.

In some embodiments, the method may include receiving, by the one or more processors, an update to the modified display unit layout from a user. The method may include creating, by the one or more processors, a database record that associates the user with the update to the modified display unit layout. For example, the database record may include a unique user identifier associated with the user. The method may include storing, by the one or more processors, the database record in a database. For example, the database may be a part of a cloud computing system, where the user may be able to access the modified display unit layout from one or more additional avionics systems (e.g., other aircraft, mobile devices).

Although FIG. 3 shows example blocks of exemplary method 300, in some implementations, the exemplary method 300 may include additional blocks, fewer blocks, different blocks, or differently arranged blocks than those depicted in FIG. 3. Additionally, or alternatively, two or more of the blocks of the exemplary method 300 may be performed in parallel.

Exemplary Device

Figure 4:
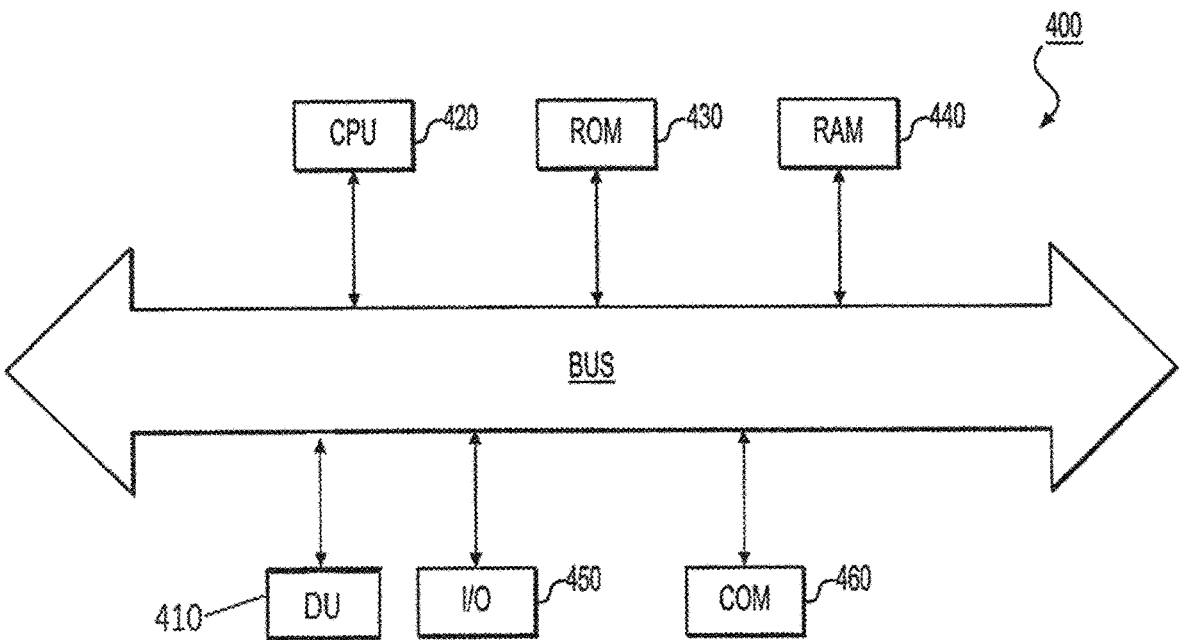
FIG. 4 depicts an example system that may execute techniques presented herein.
Figure 5:
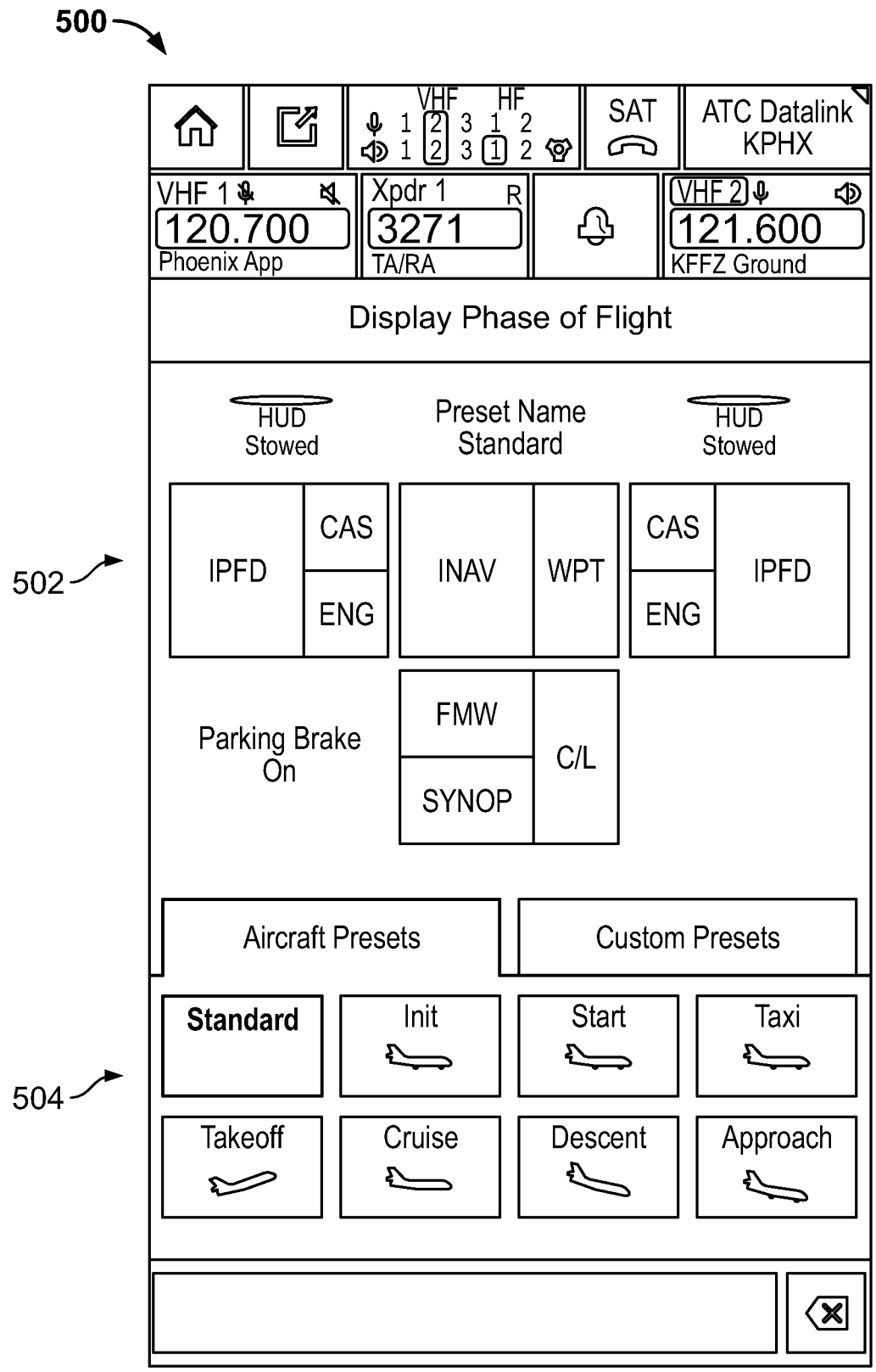
Figure 6:
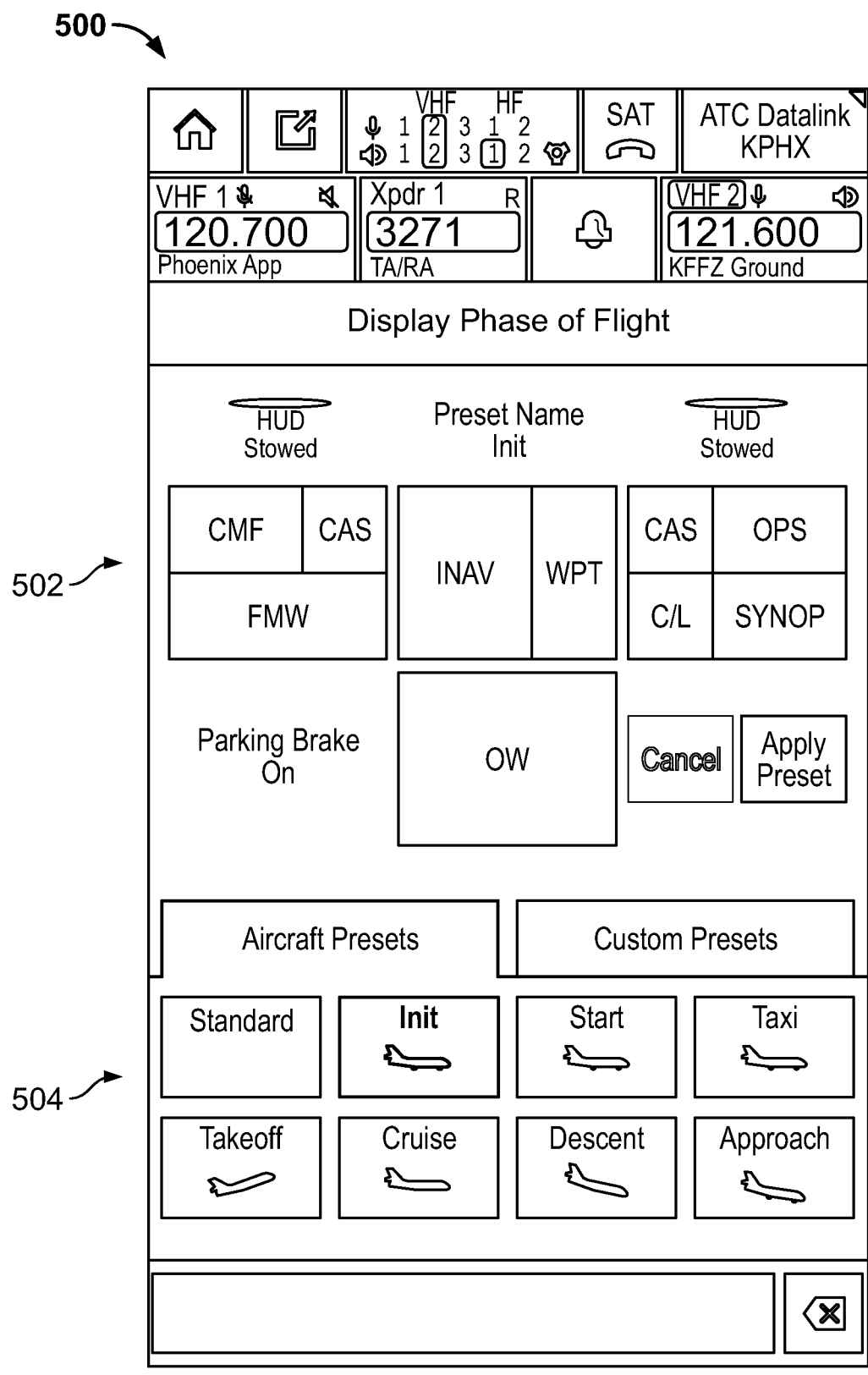
Figure 7:
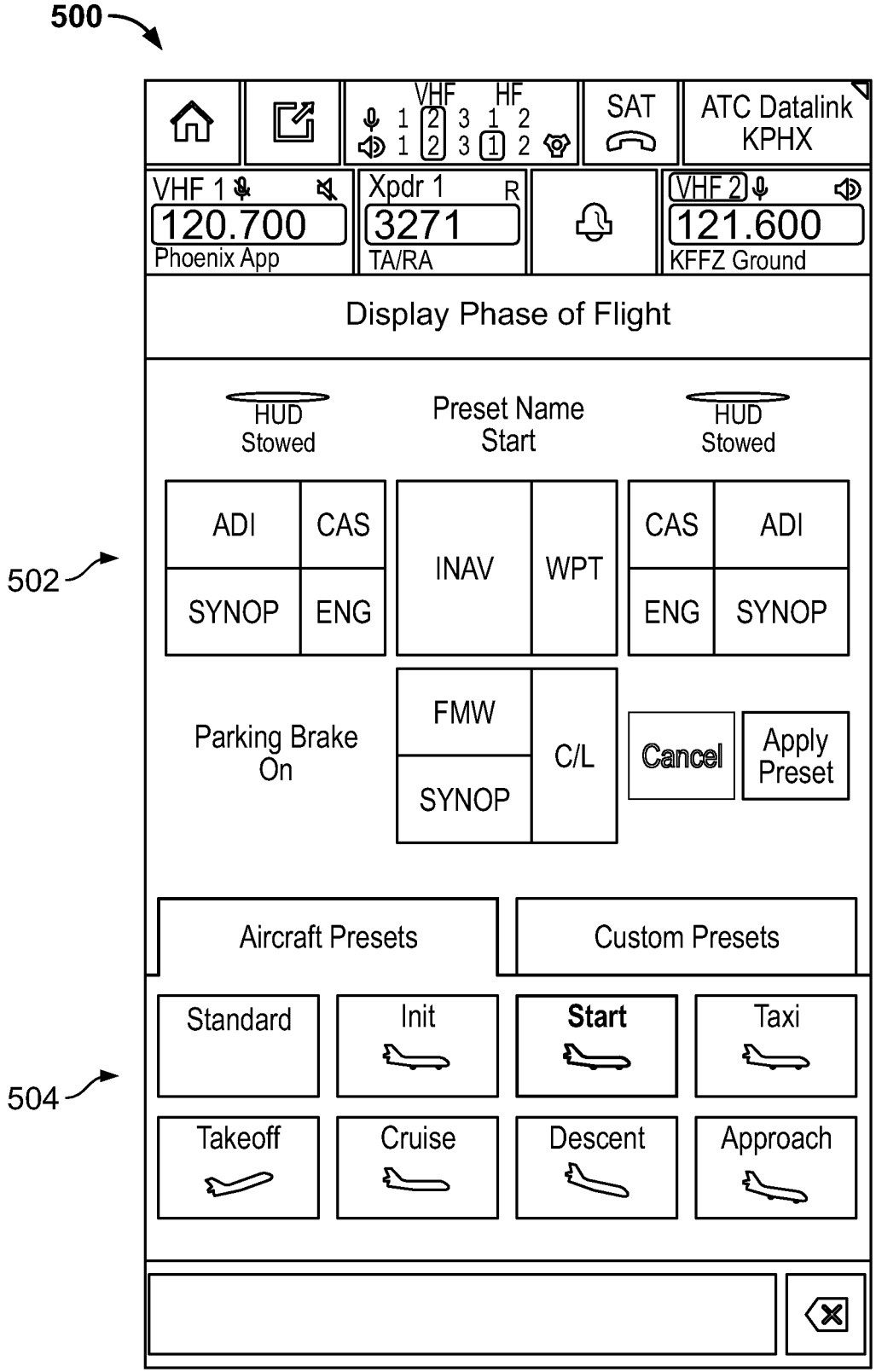
Figure 8:
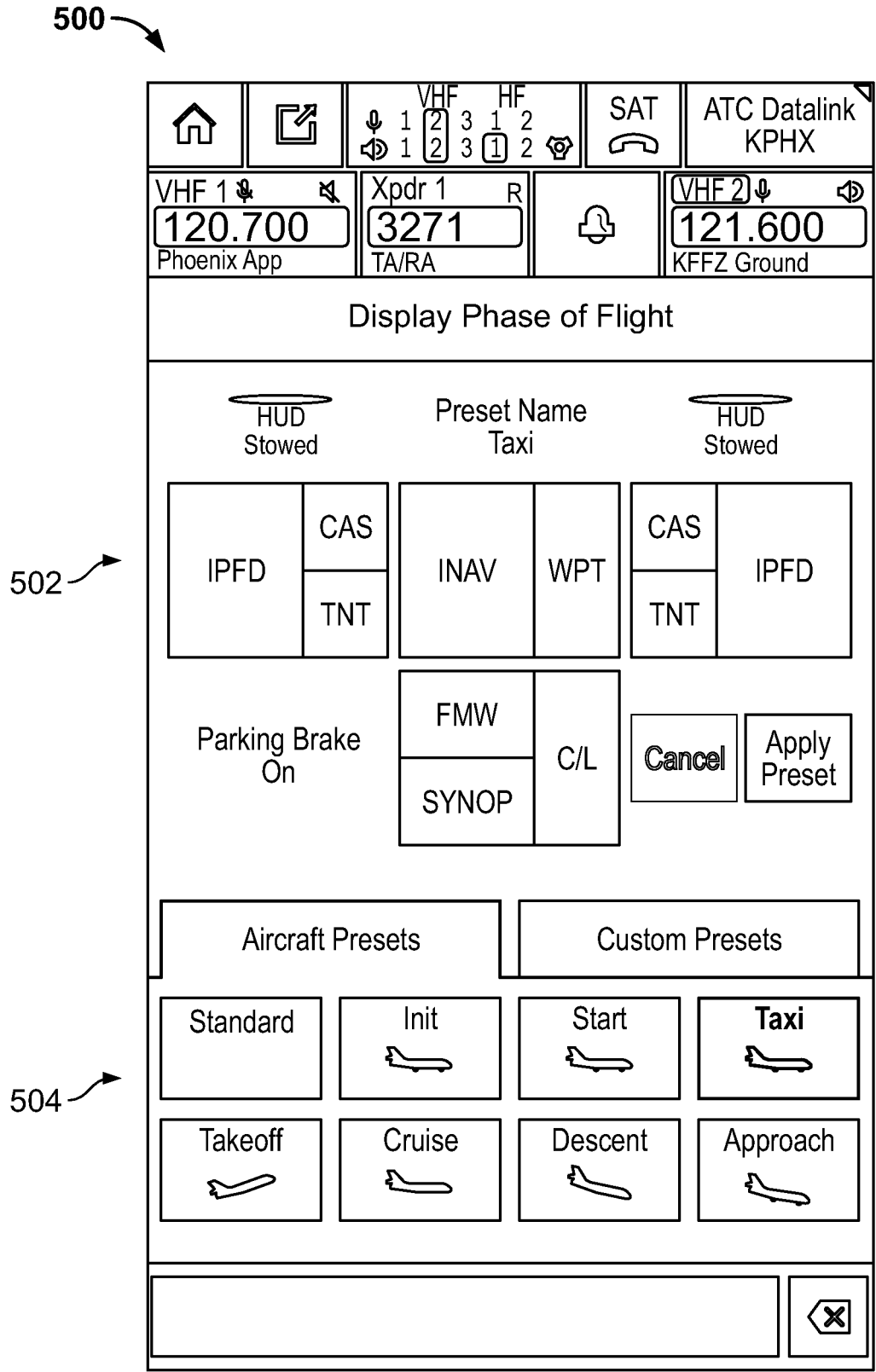
Figure 9:
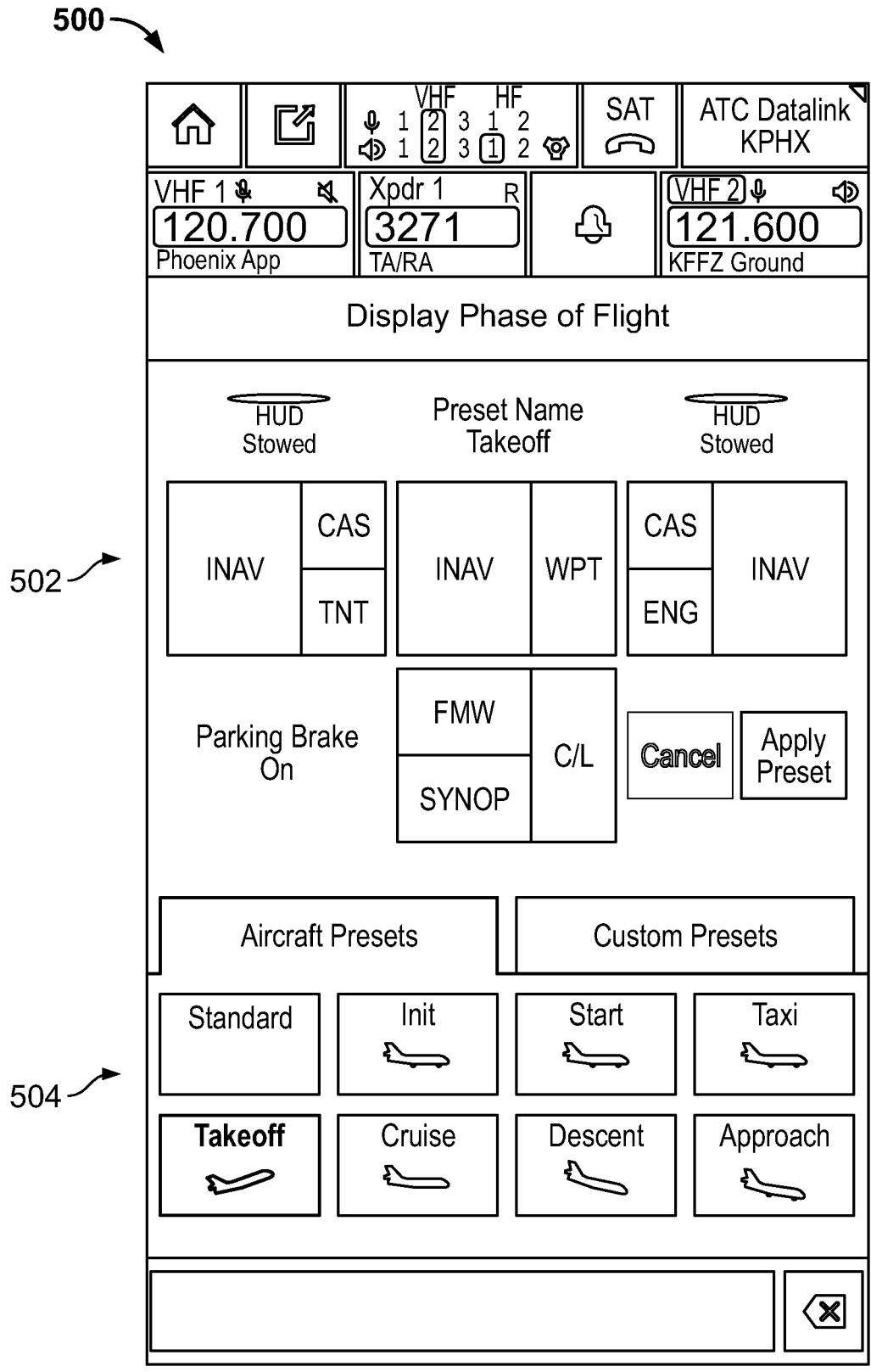
Figure 10:
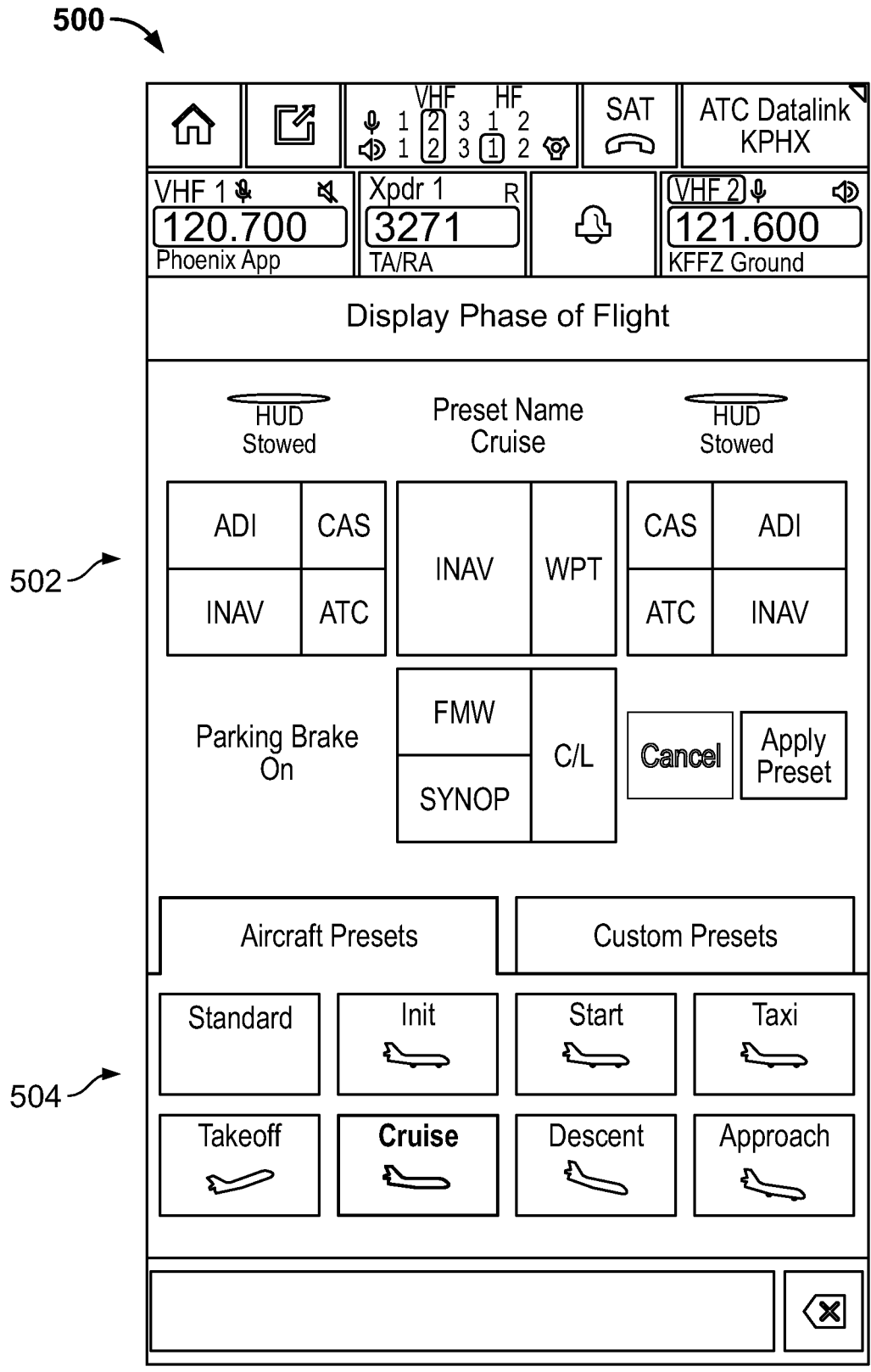
Figure 11:
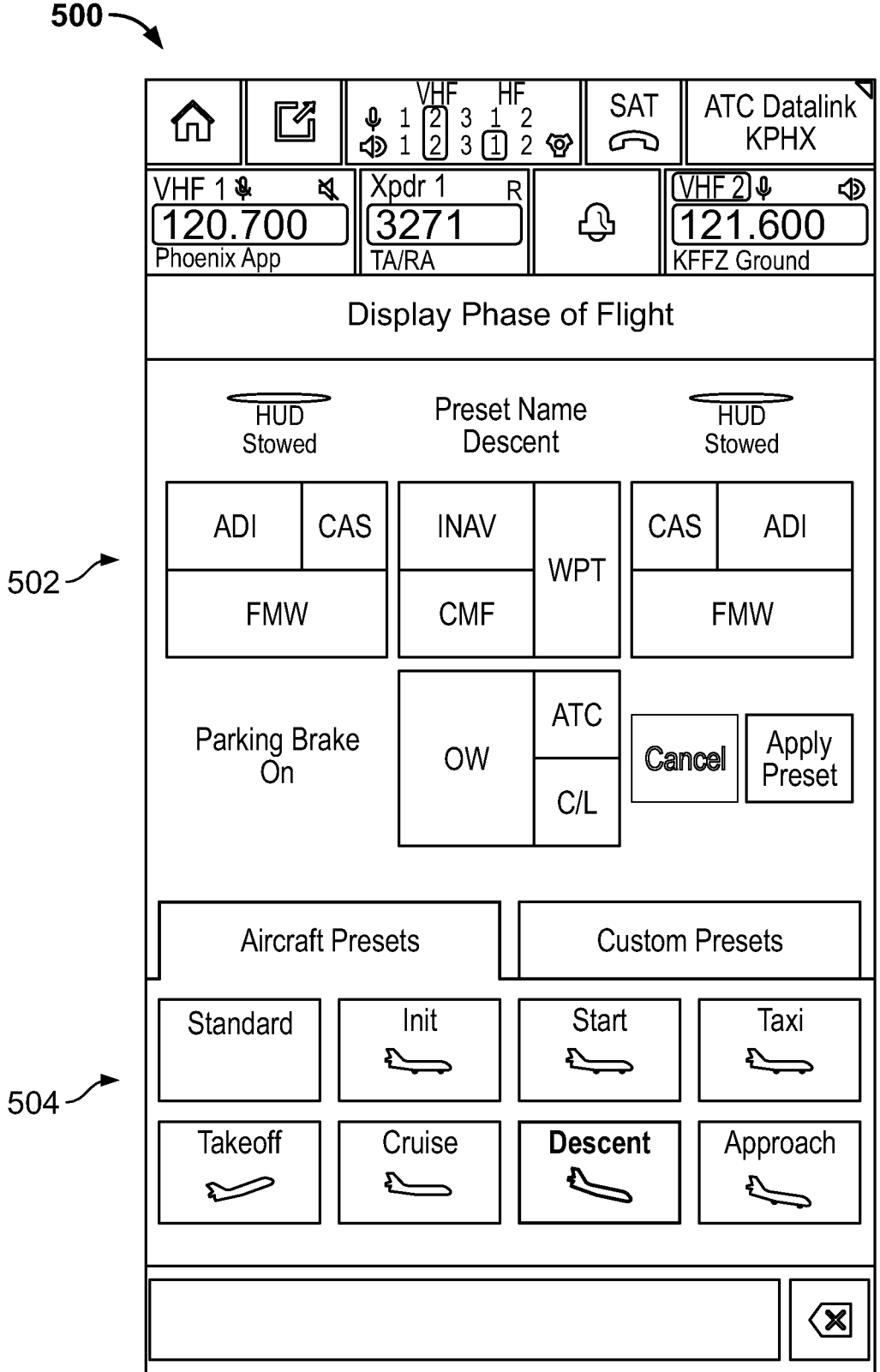
Figure 12:
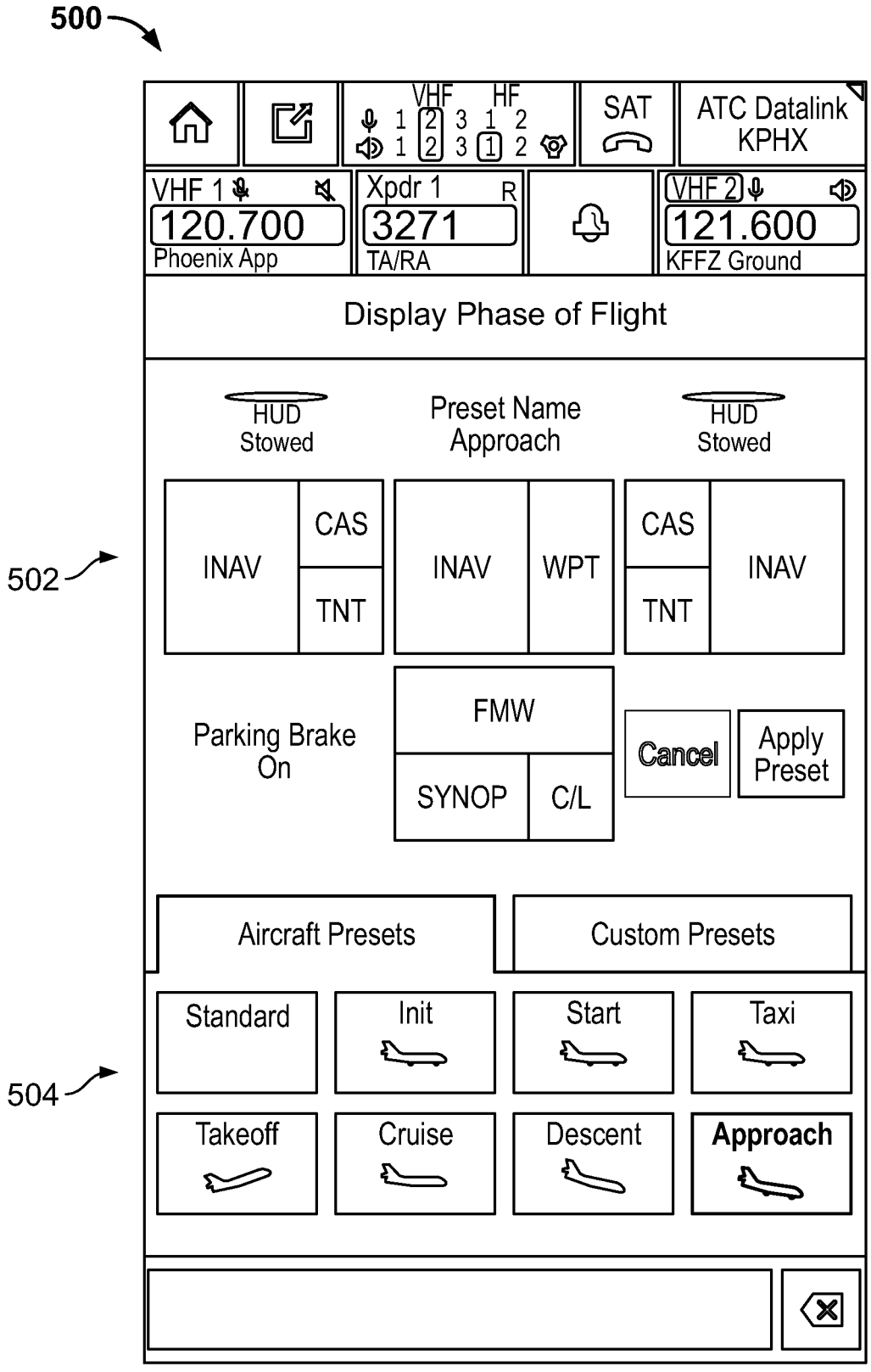

FIG. 4 is a simplified functional block diagram of a computer 400 that may be configured as a device for executing the methods of FIGS. 2-3, according to exemplary embodiments of the present disclosure, and for rendering various images on one or more display units (DU) 410, such as the control display 36 in FIG. 1. For example, device 400 may include a central processing unit (CPU) 420. CPU 420 may be any type of processor device including, for example, any type of special purpose or a general-purpose micropro-cessor device. As will be appreciated by persons skilled in the relevant art, CPU 420 also may be a single processor in a multi-core/multiprocessor system, such system operating alone, or in a cluster of computing devices operating in a cluster or server farm. CPU 420 may be connected to a data communication infrastructure 410, for example, a bus, mes-sage queue, network, or multi-core message-passing scheme.

Device 400 also may include a main memory 440, for example, random access memory (RAM), and also may include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a remov-able storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium hav-ing stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

Device 400 also may include a communications interface ("COM") 460. Communications interface 460 allows soft-ware and data to be transferred between device 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link or other communications channels.

The hardware elements, operating systems and program-ming languages of such equipment are conventional in nature, and it is presumed that those skilled in the art are adequately familiar therewith. Device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate program-ming of one computer hardware platform.

Figure 13:
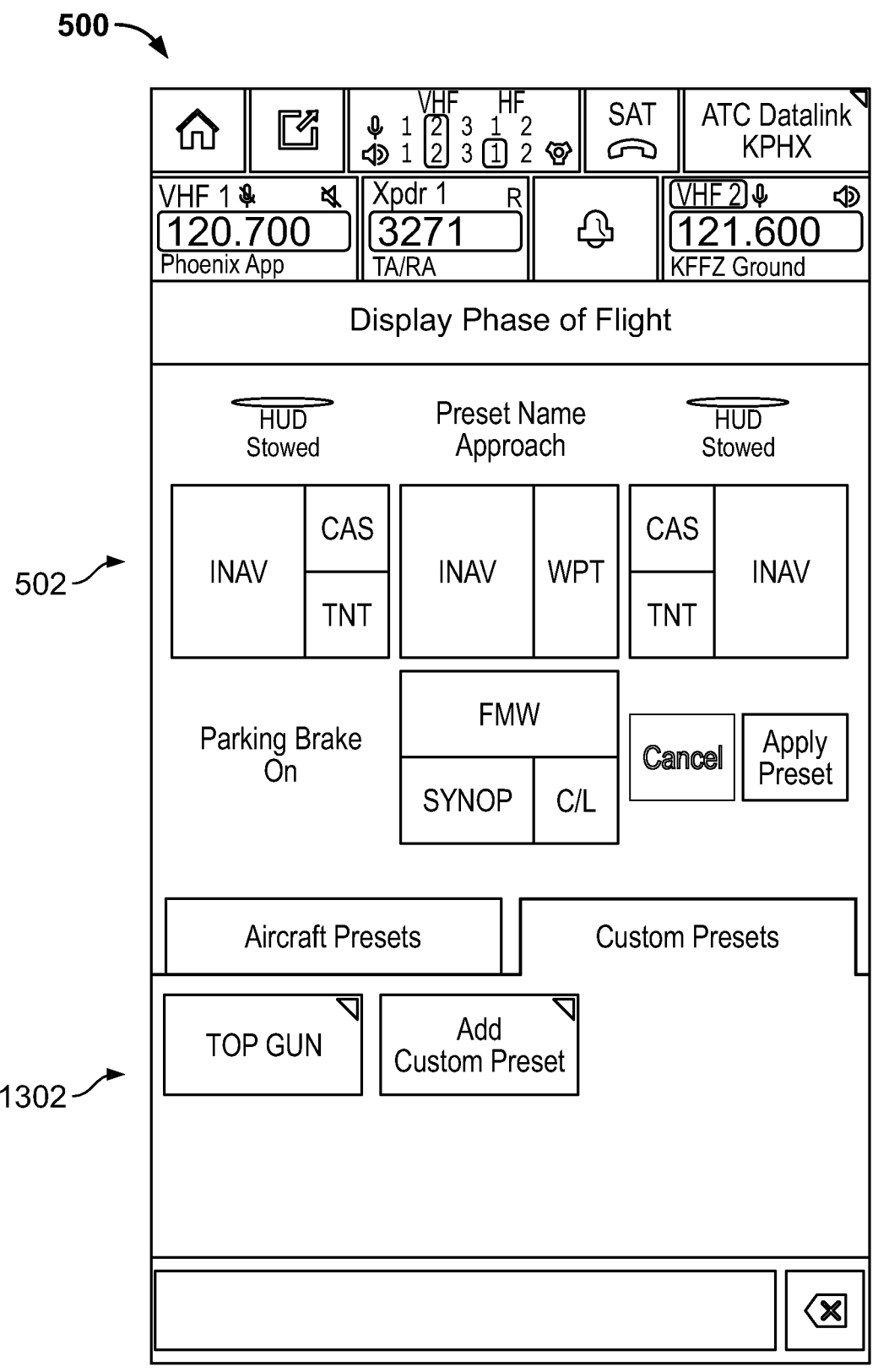

Some example images that may be rendered on the display unit(s) 410 are depicted in FIGS. 5-48. Specifically, FIGS. 5-12 depict images 500 of selectable display unit layouts 502 for various different manufacturer specified presets, such as different flight phases 504, and FIG. 13 depicts an image of a selectable display unit layout 502 associated with a previously created/added customized pre-set 1302.

Figure 14:
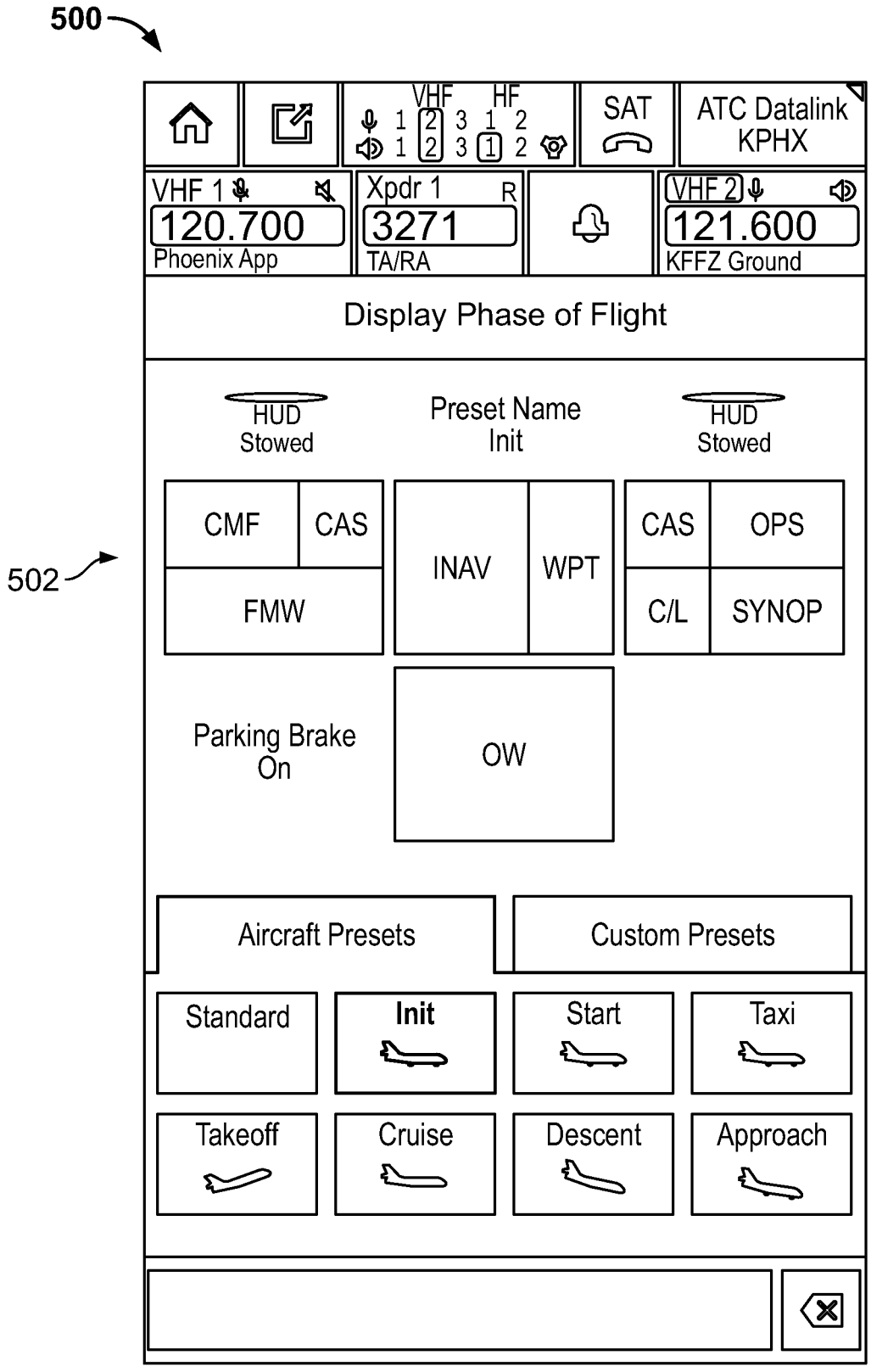
Figure 15:
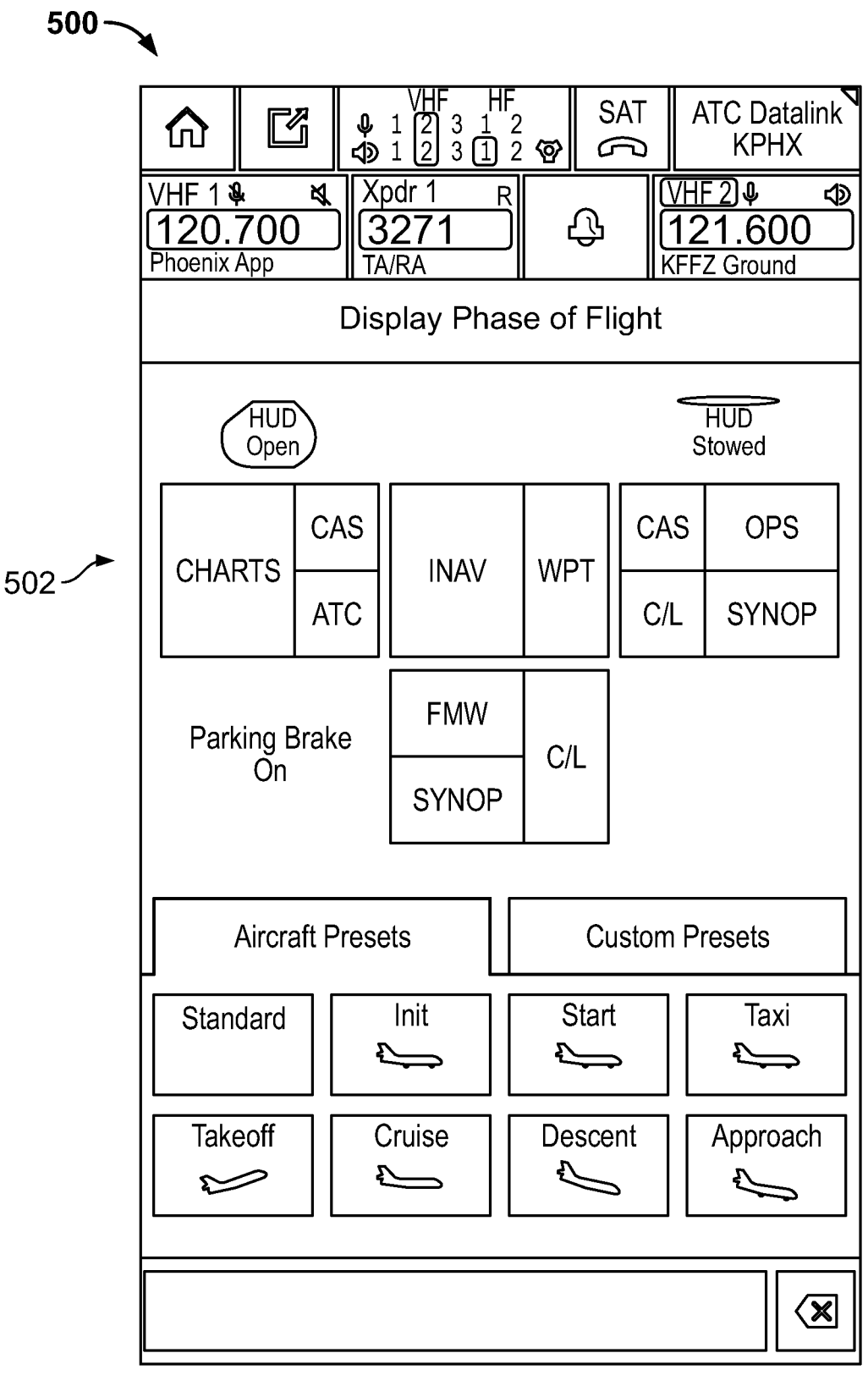
Figure 16:
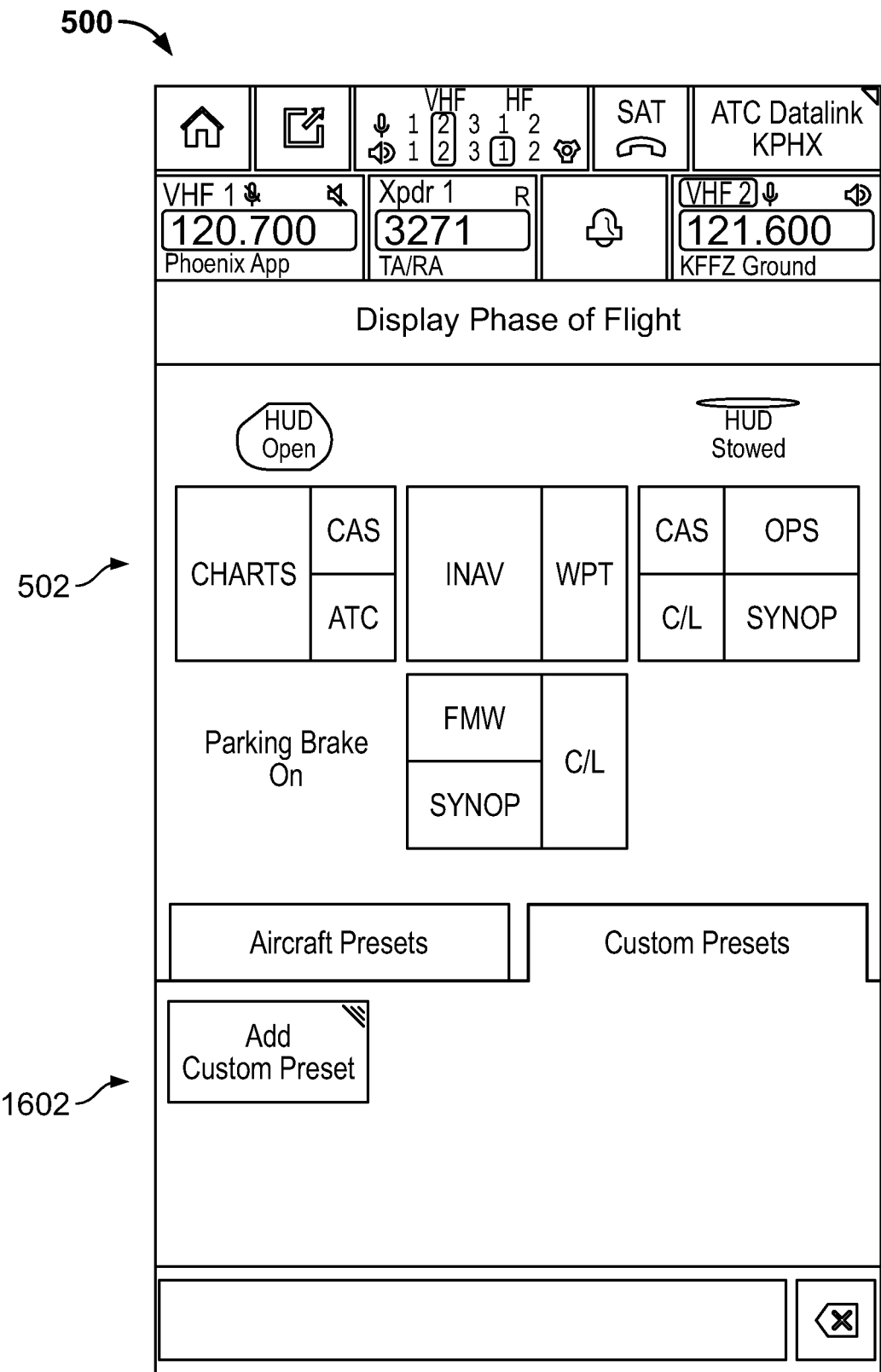
Figure 17:
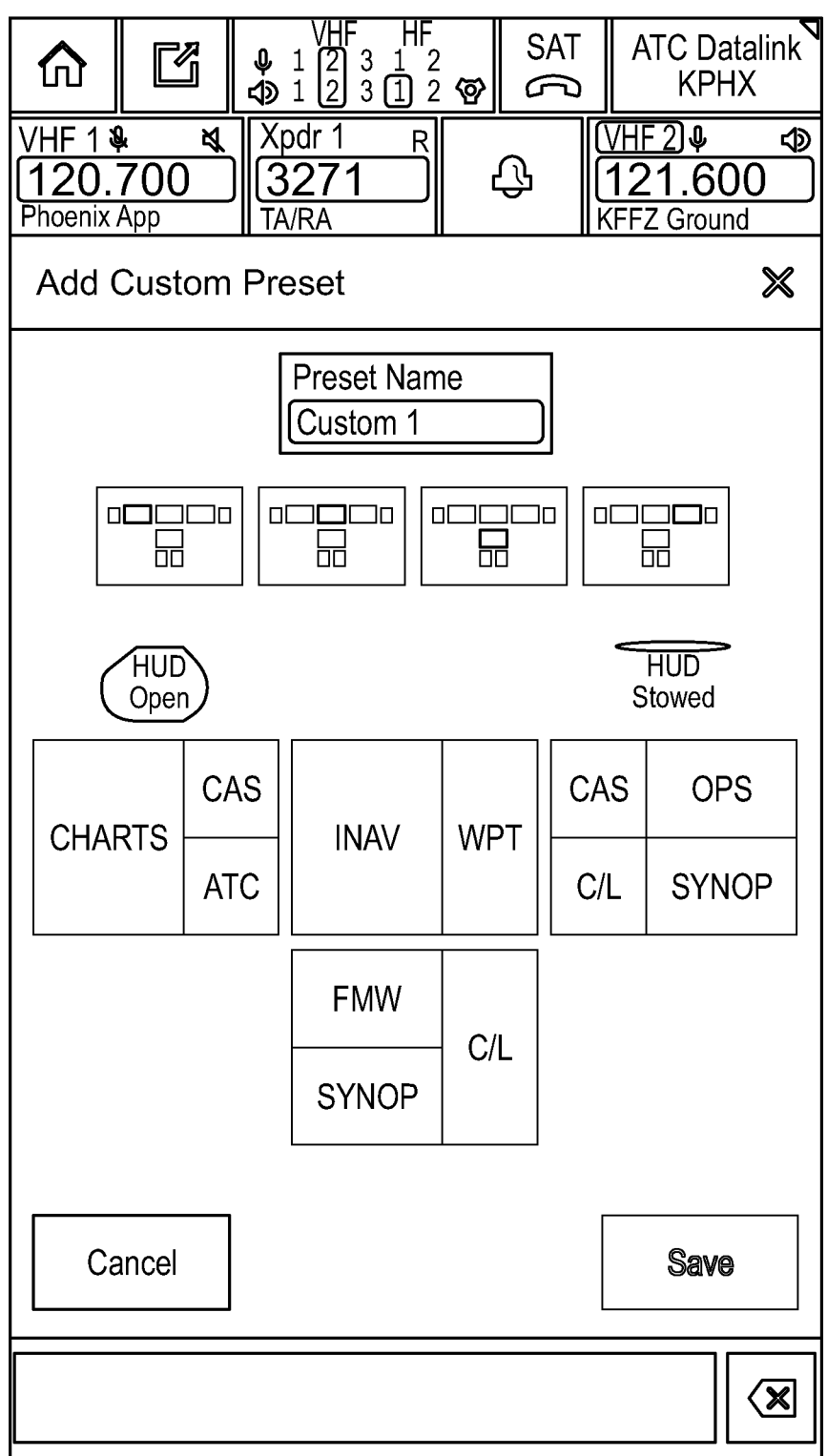
Figure 18:
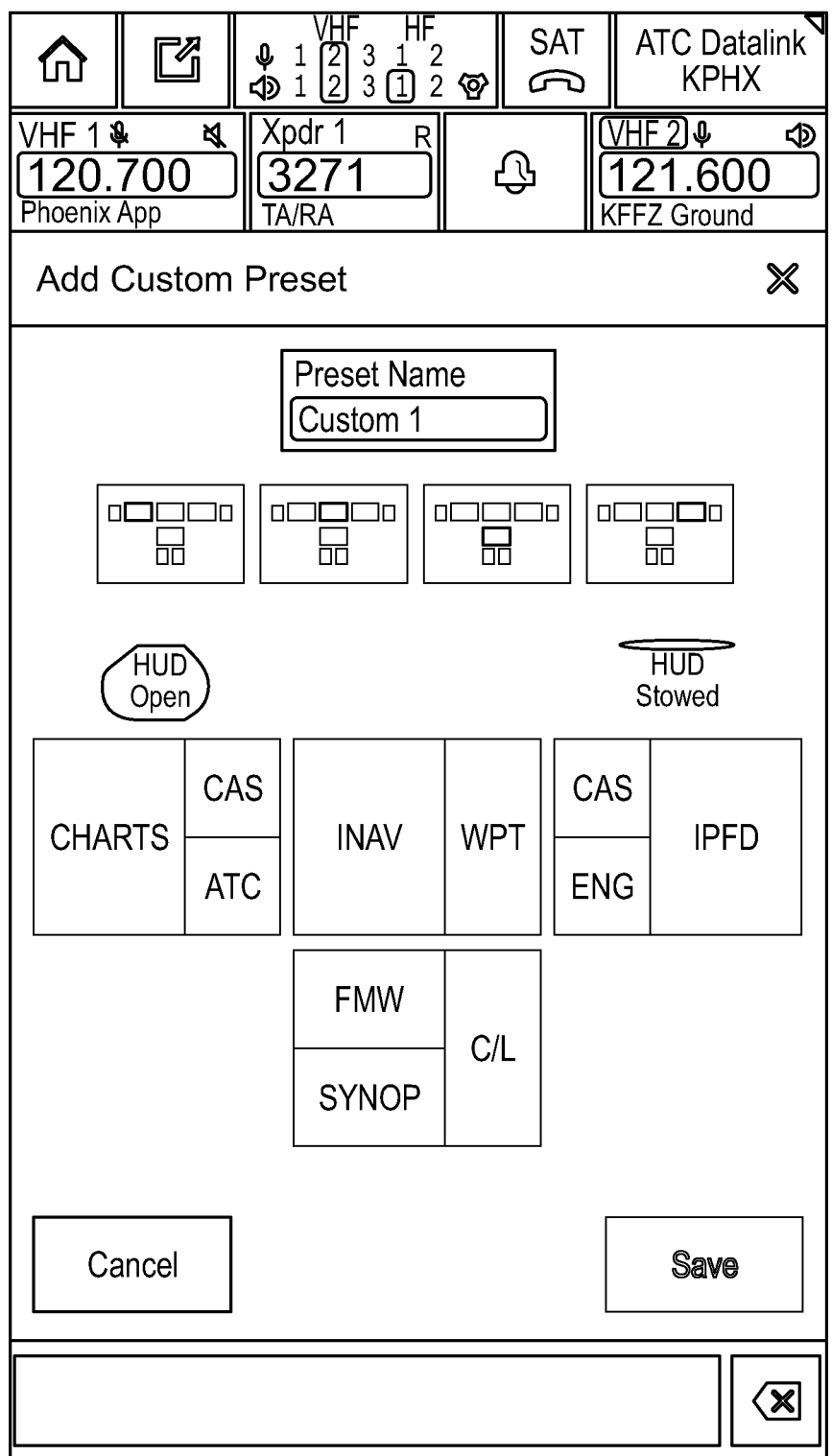
Figure 20:
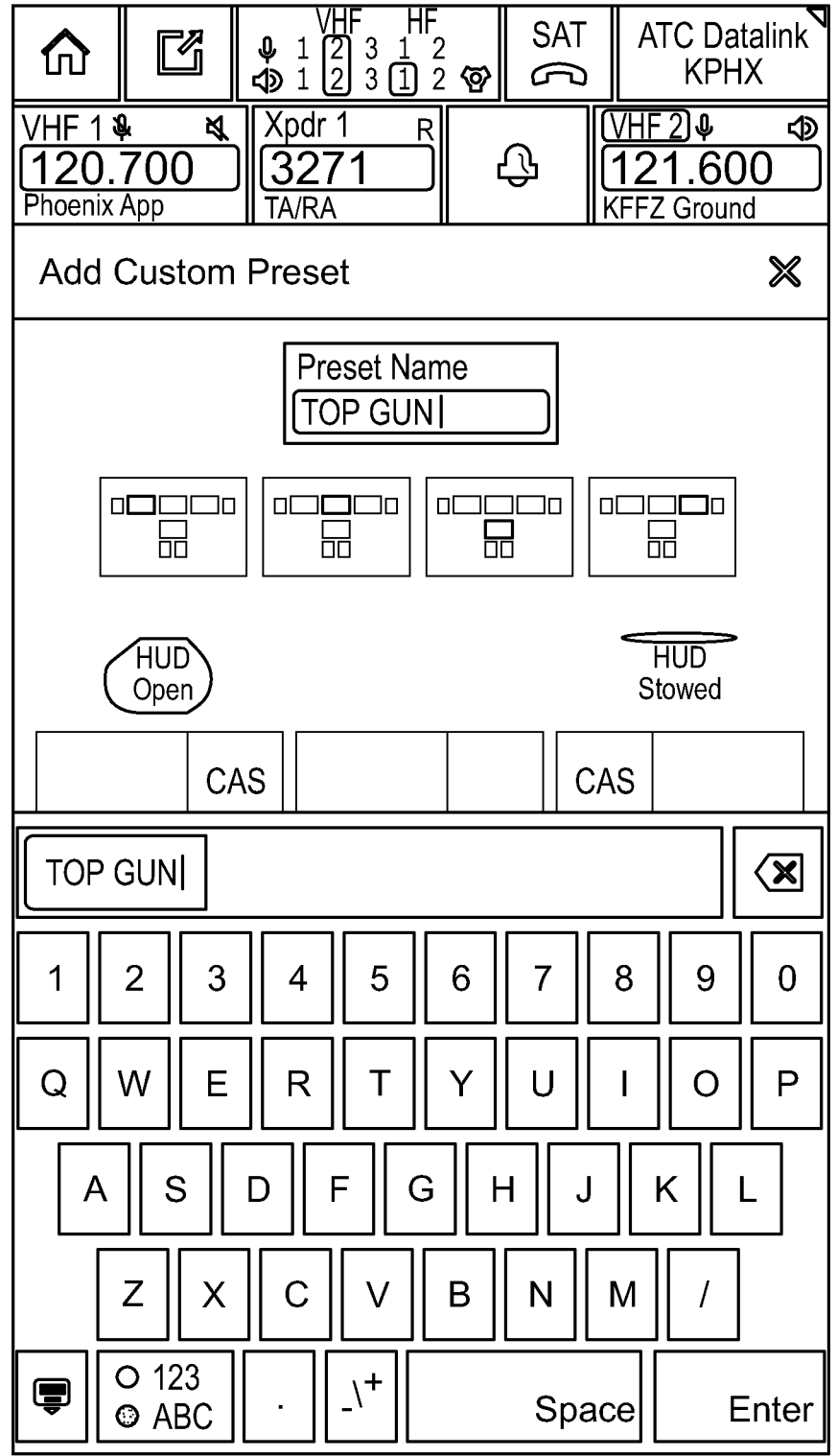
Figure 21:
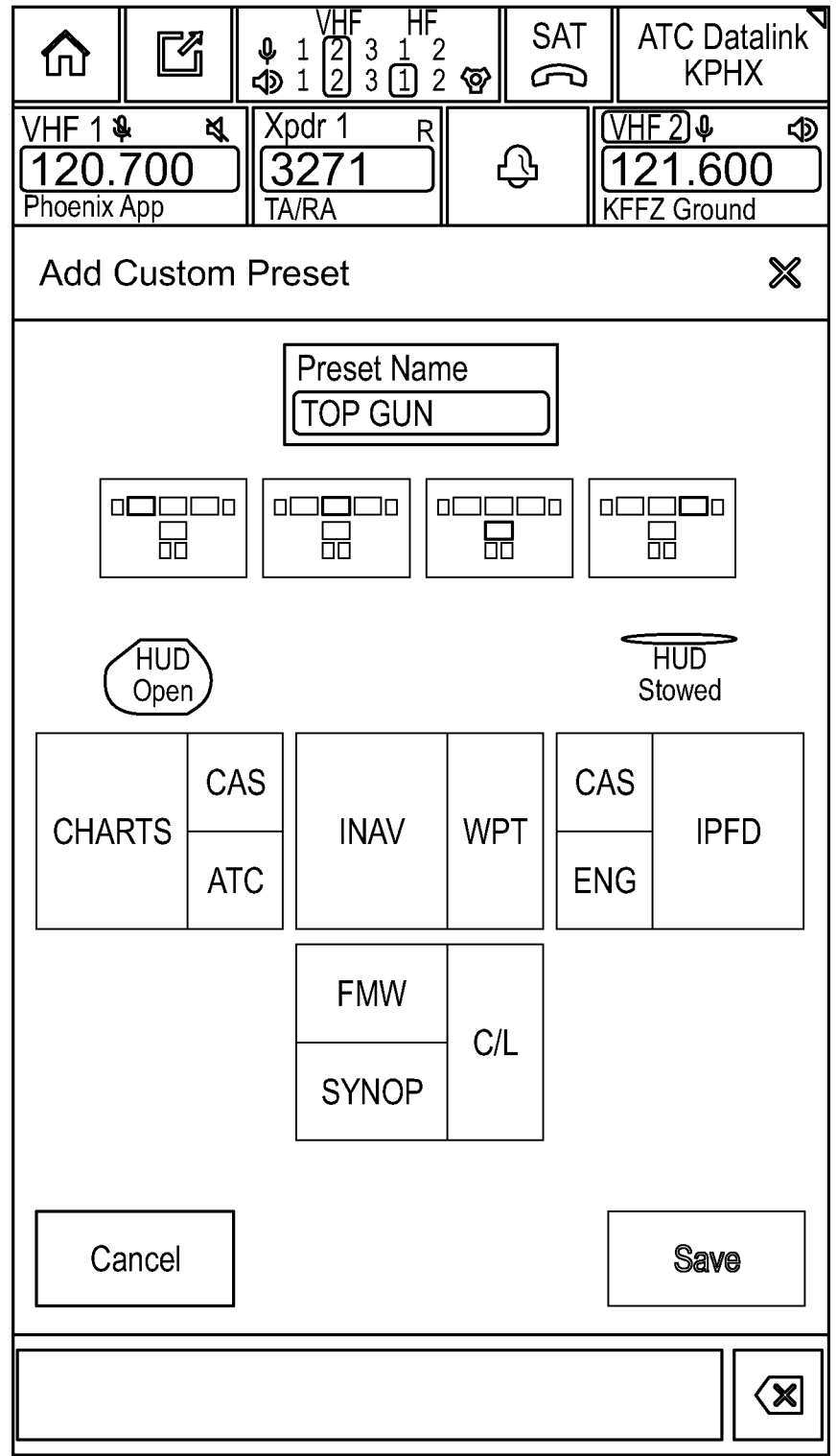
Figure 22:
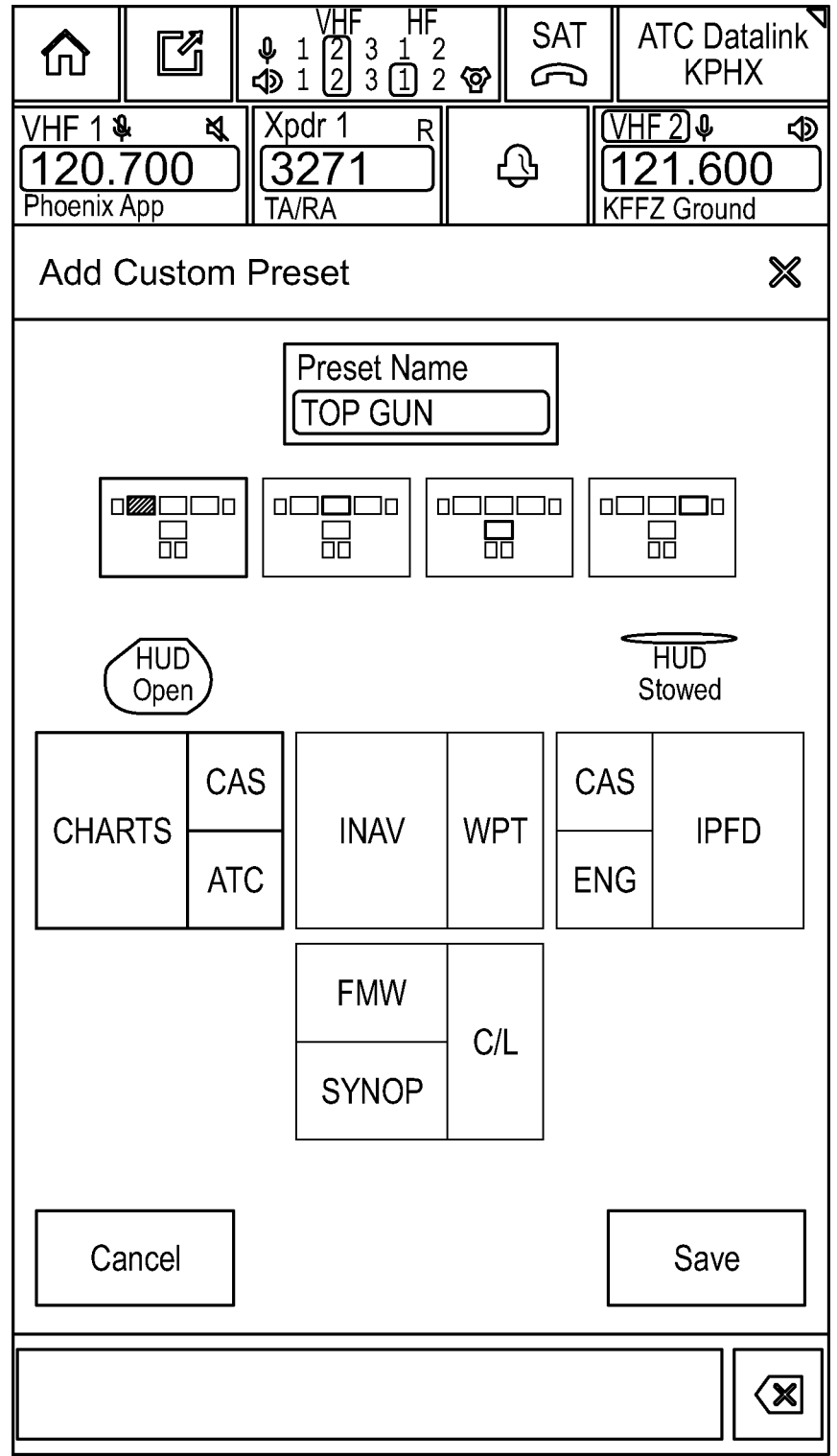
Figure 23:
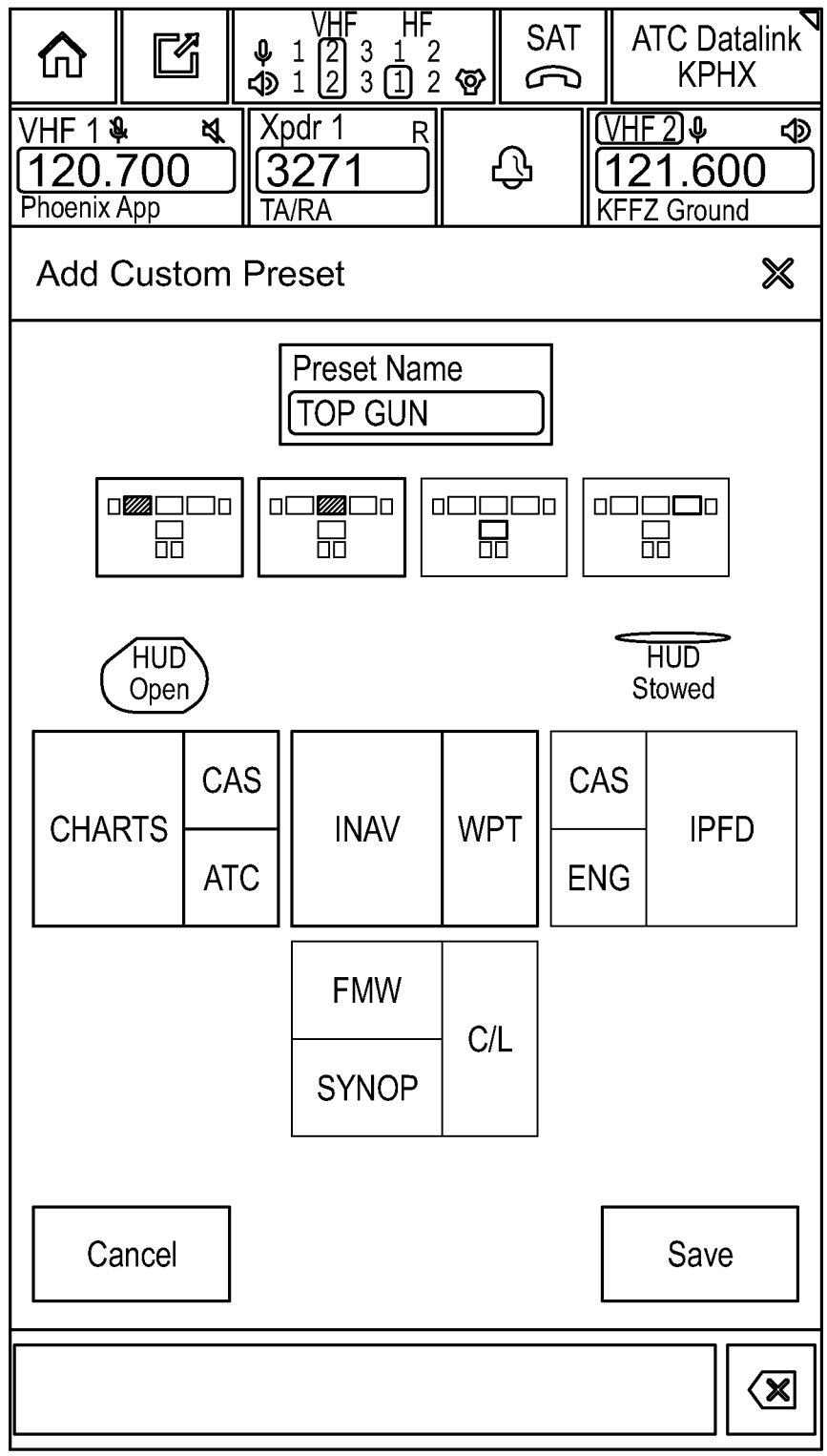
Figure 24:
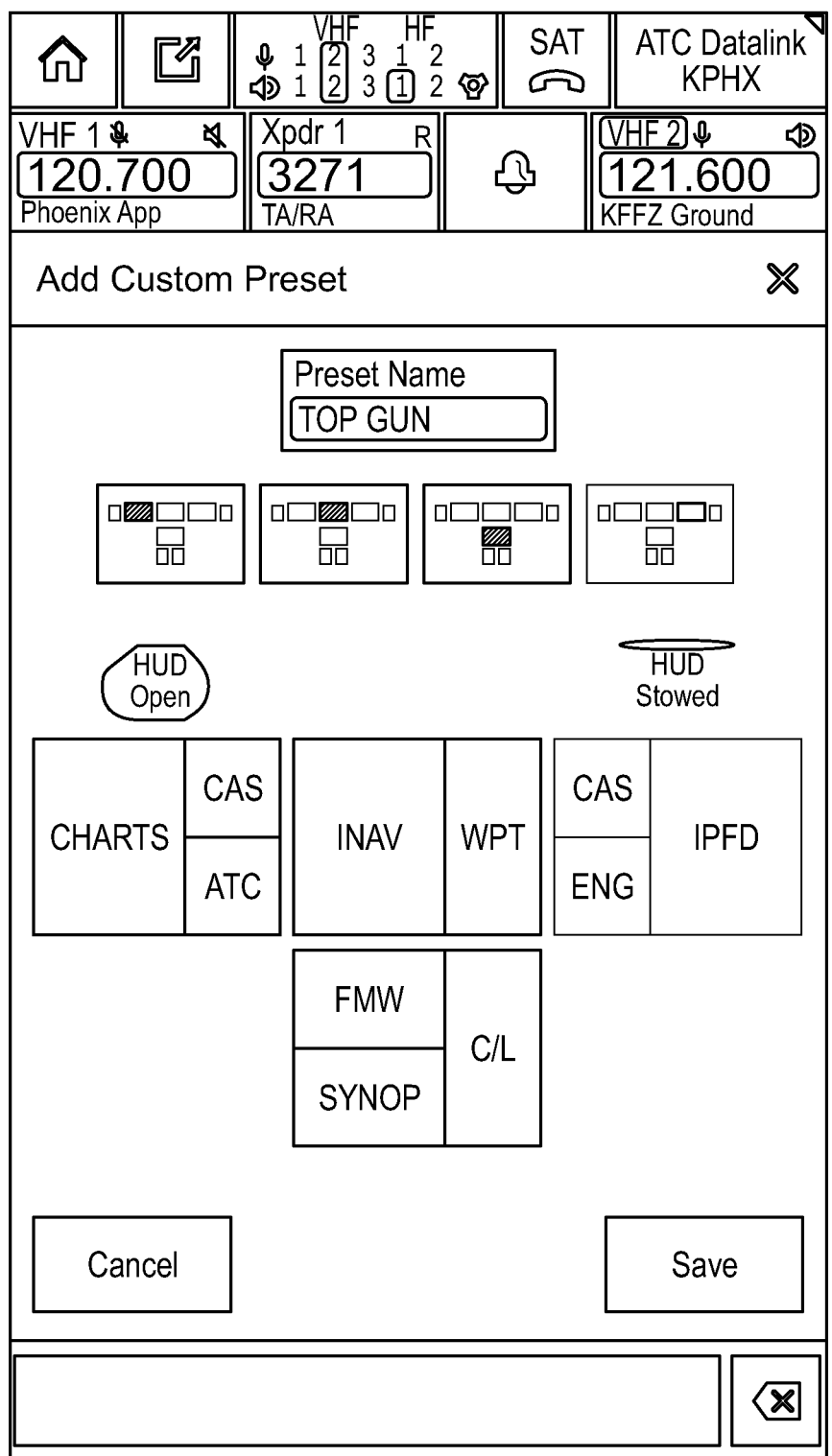
Figure 25:
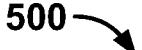
Figure 28:
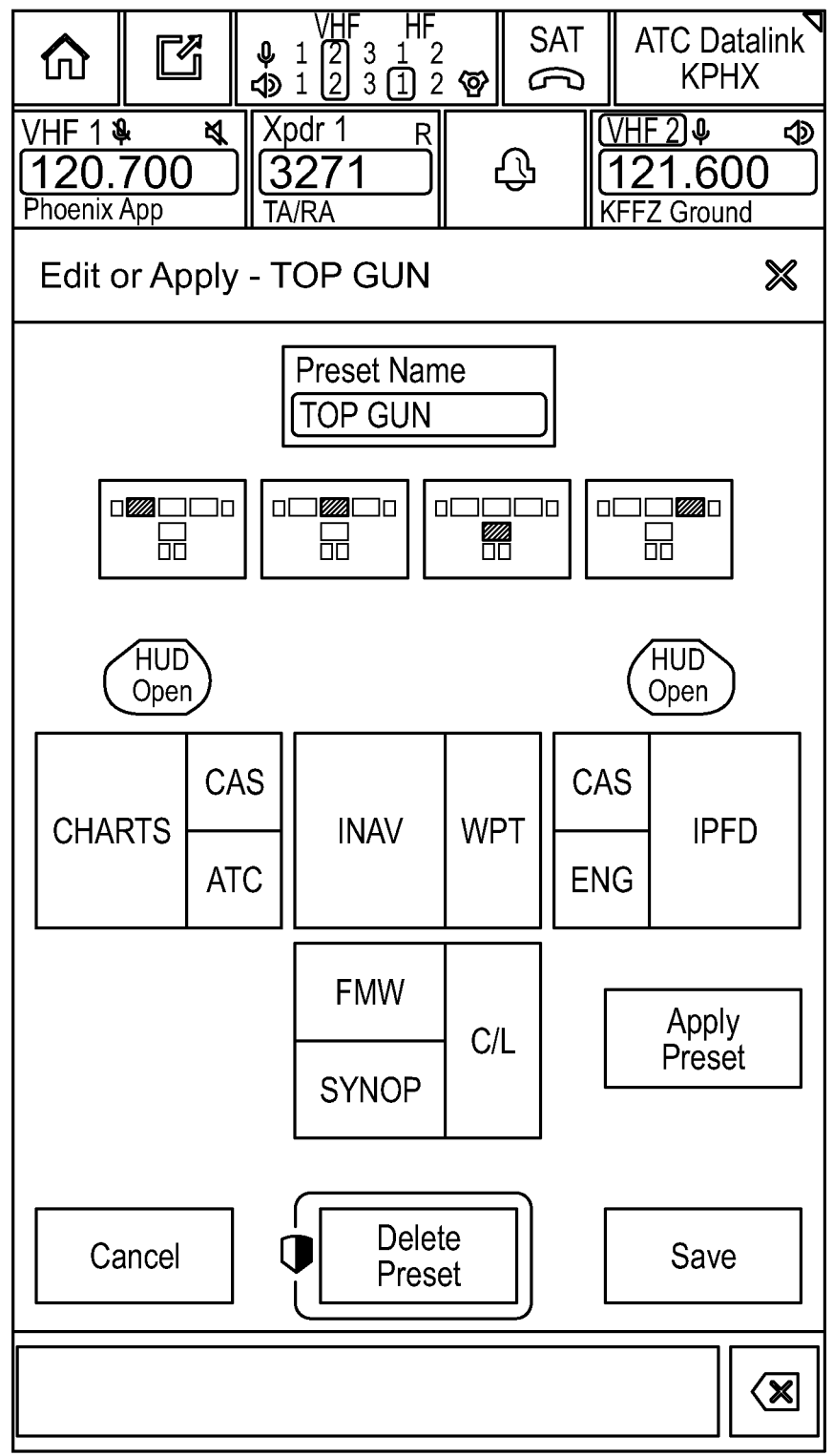
Figure 29:
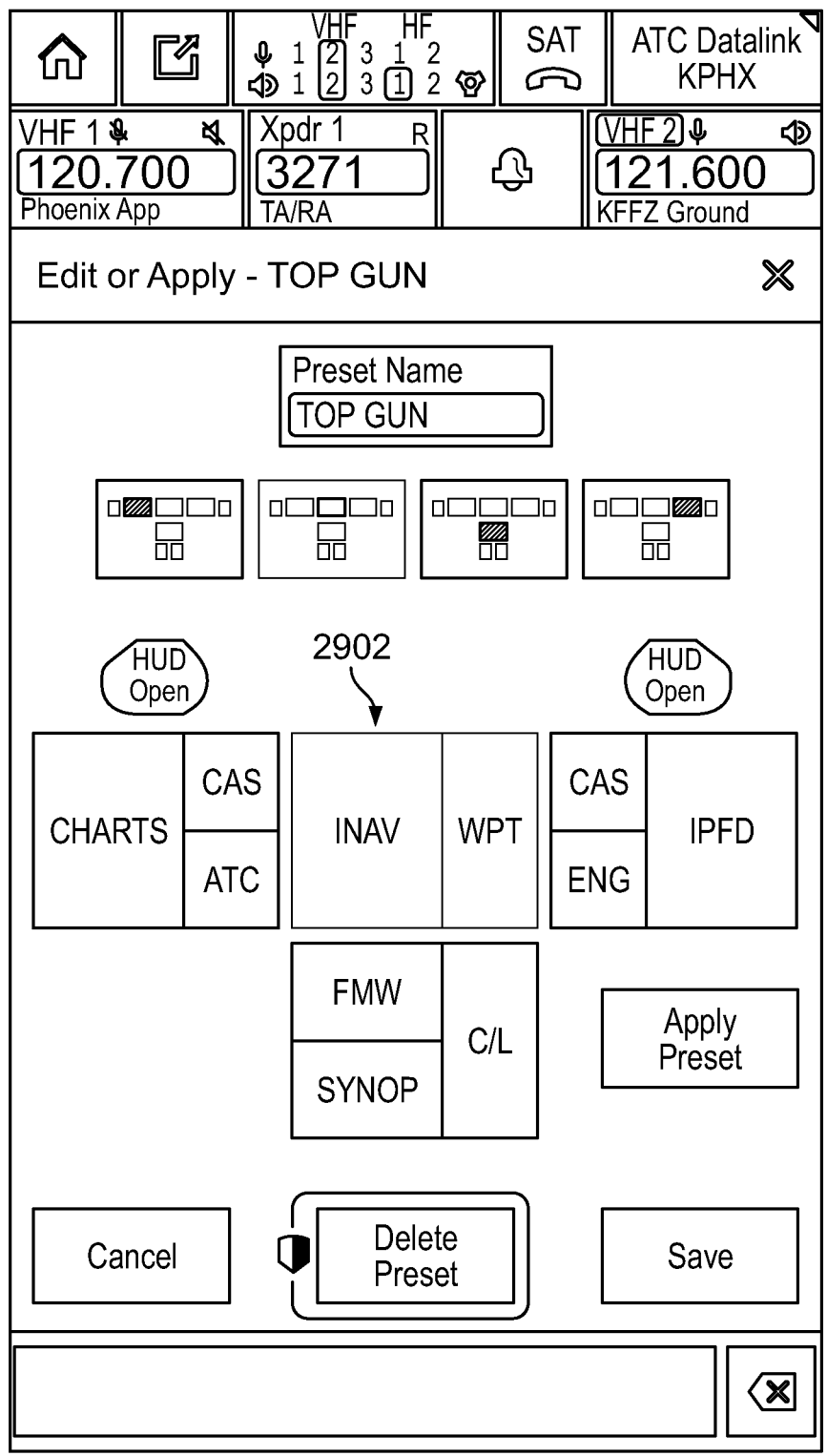
Figure 30:
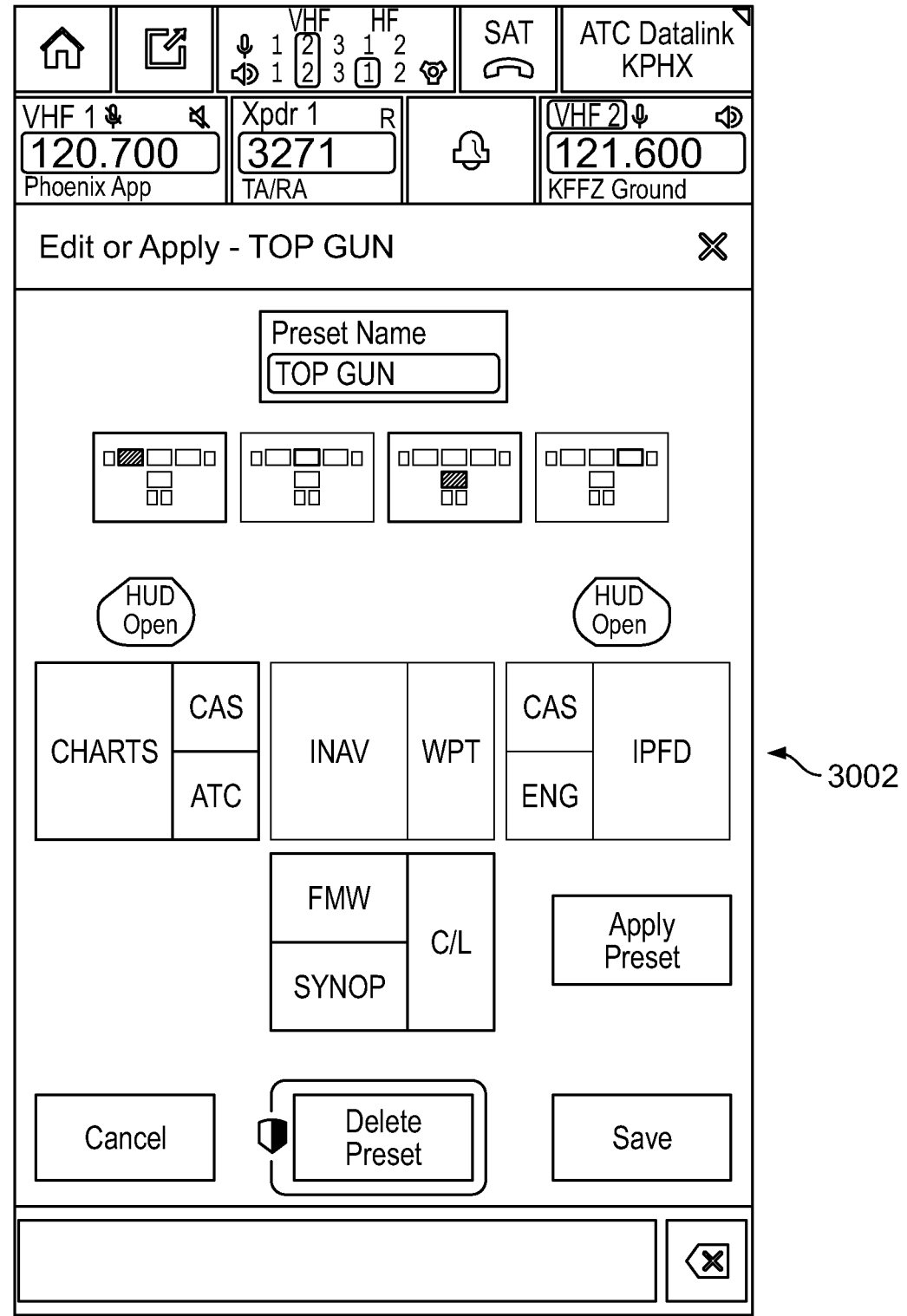
Figure 32:
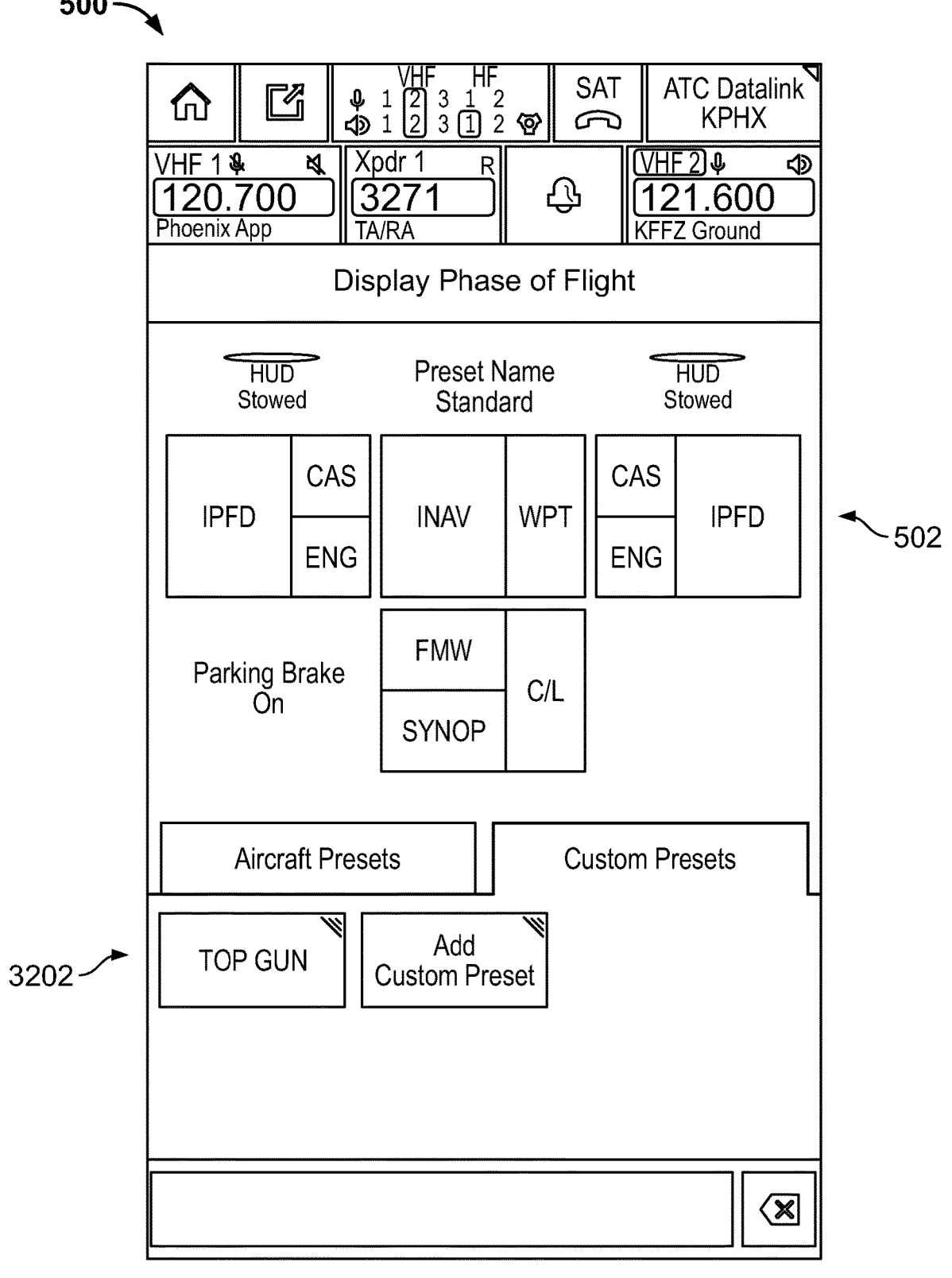
Figure 33:
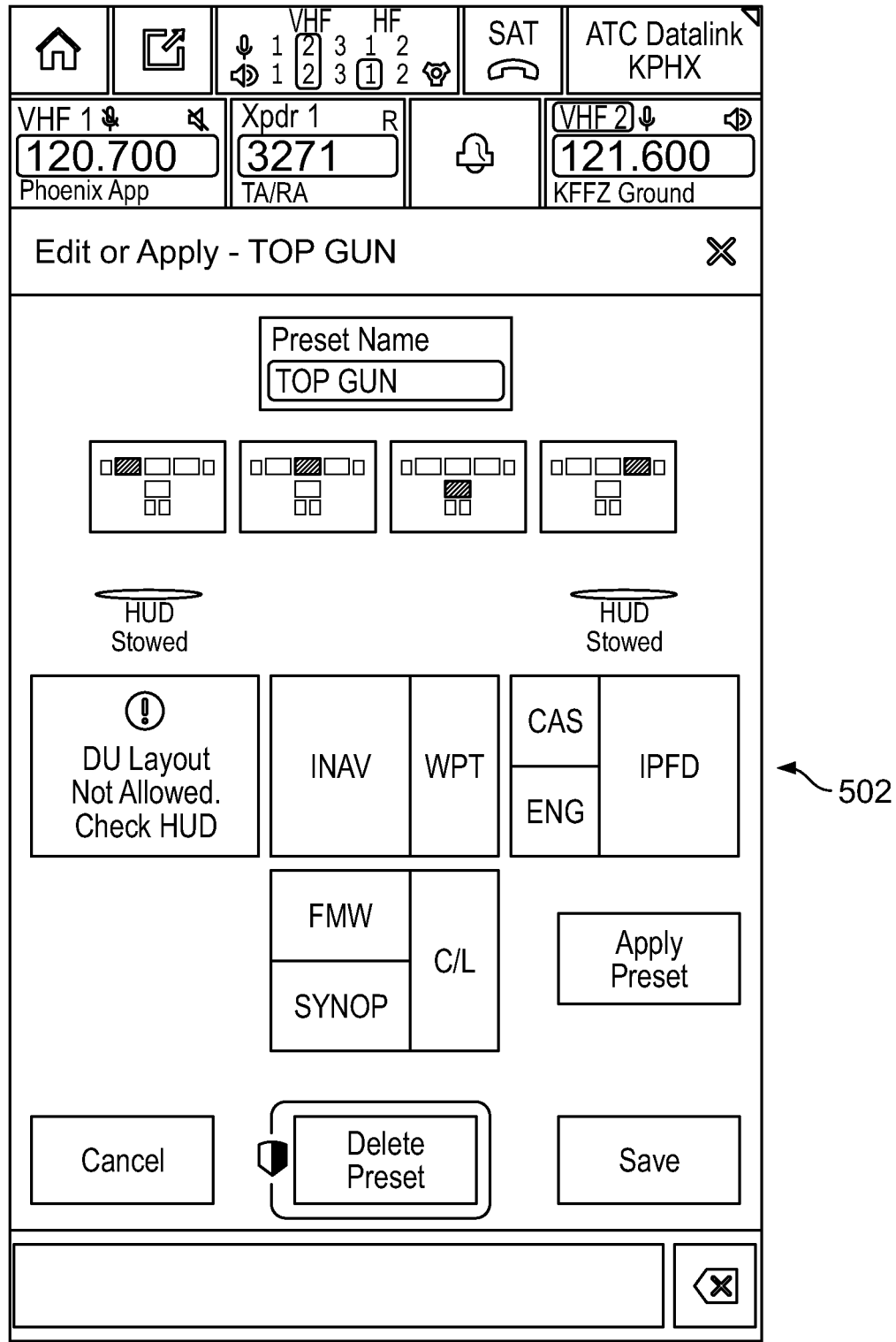

FIGS. 14 and 15 depict an example image 500 that may be rendered when the flight crew adjusts the display unit layout 502; changing it from the "active" preset.

FIGS. 16-26 depict the images that may be rendered when the flight crew is creating/adding a customized preset 1602 entitled "TOP GUN."

FIGS. 27-31 depict images that may be rendered when the flight crew opens a customized preset and decides to de-select specific display units 2902 (FIG. 29) and 3002 (FIG. 30) before applying the presets.

Figure 34:
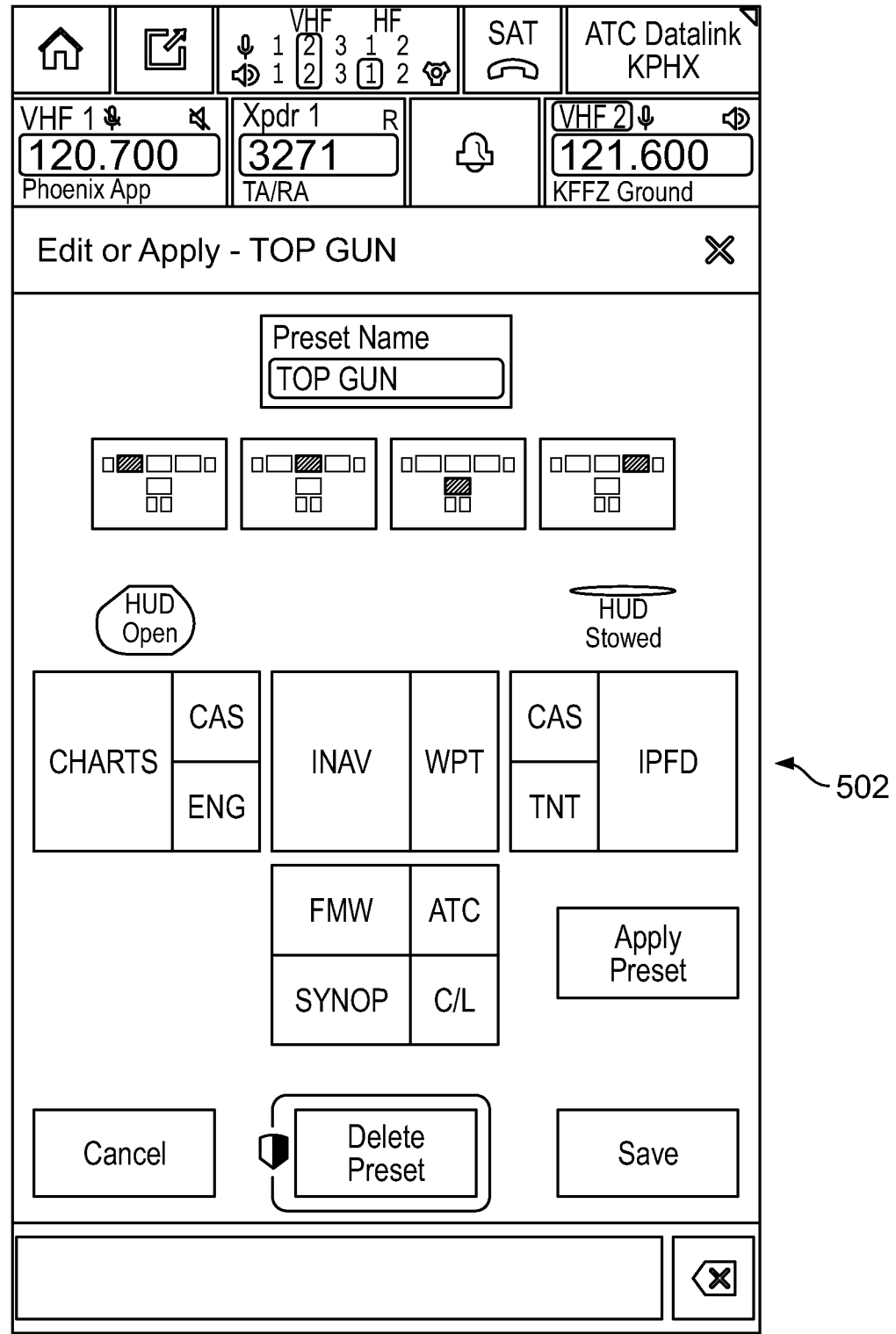
Figure 36:
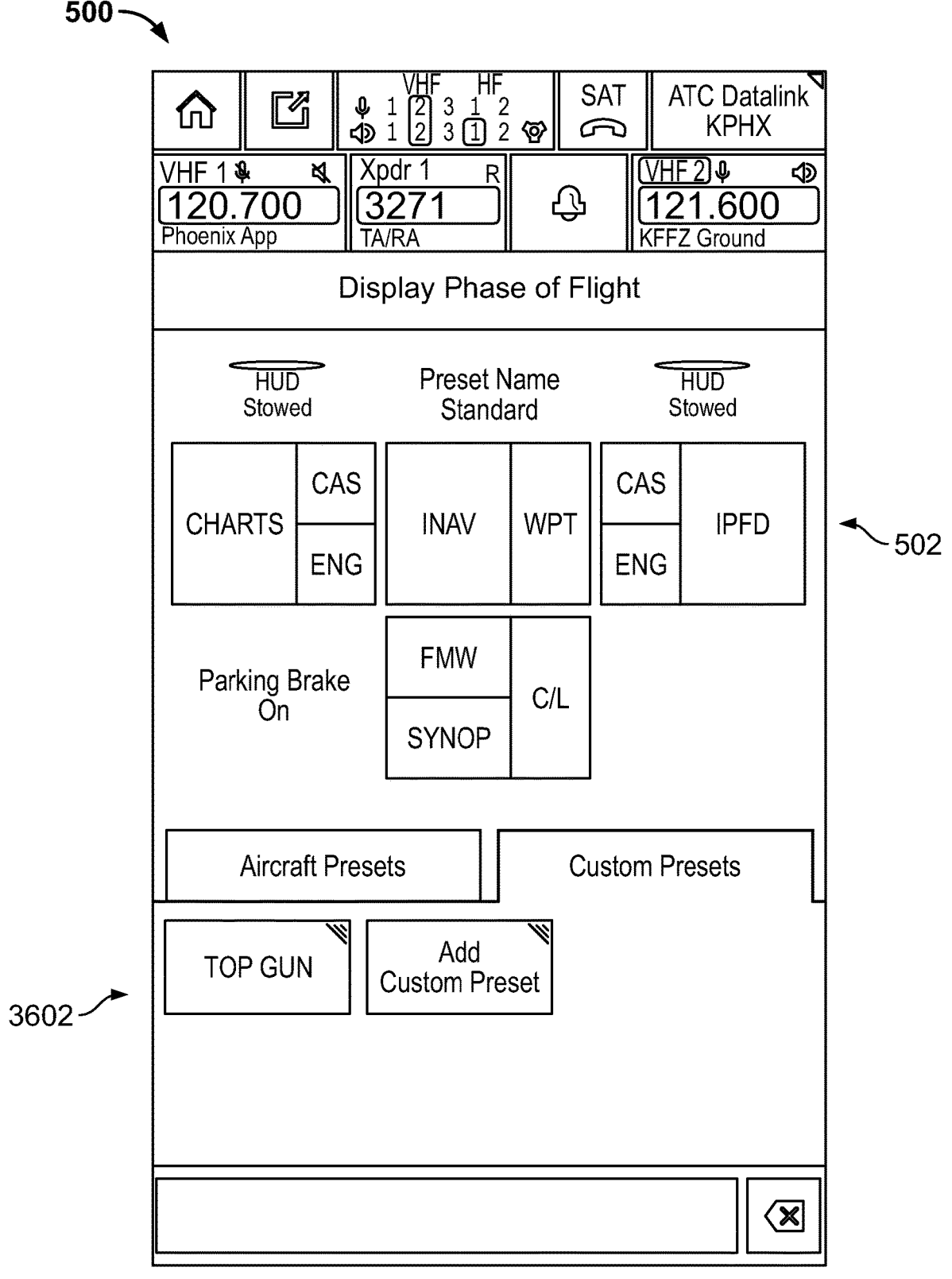
Figure 37:
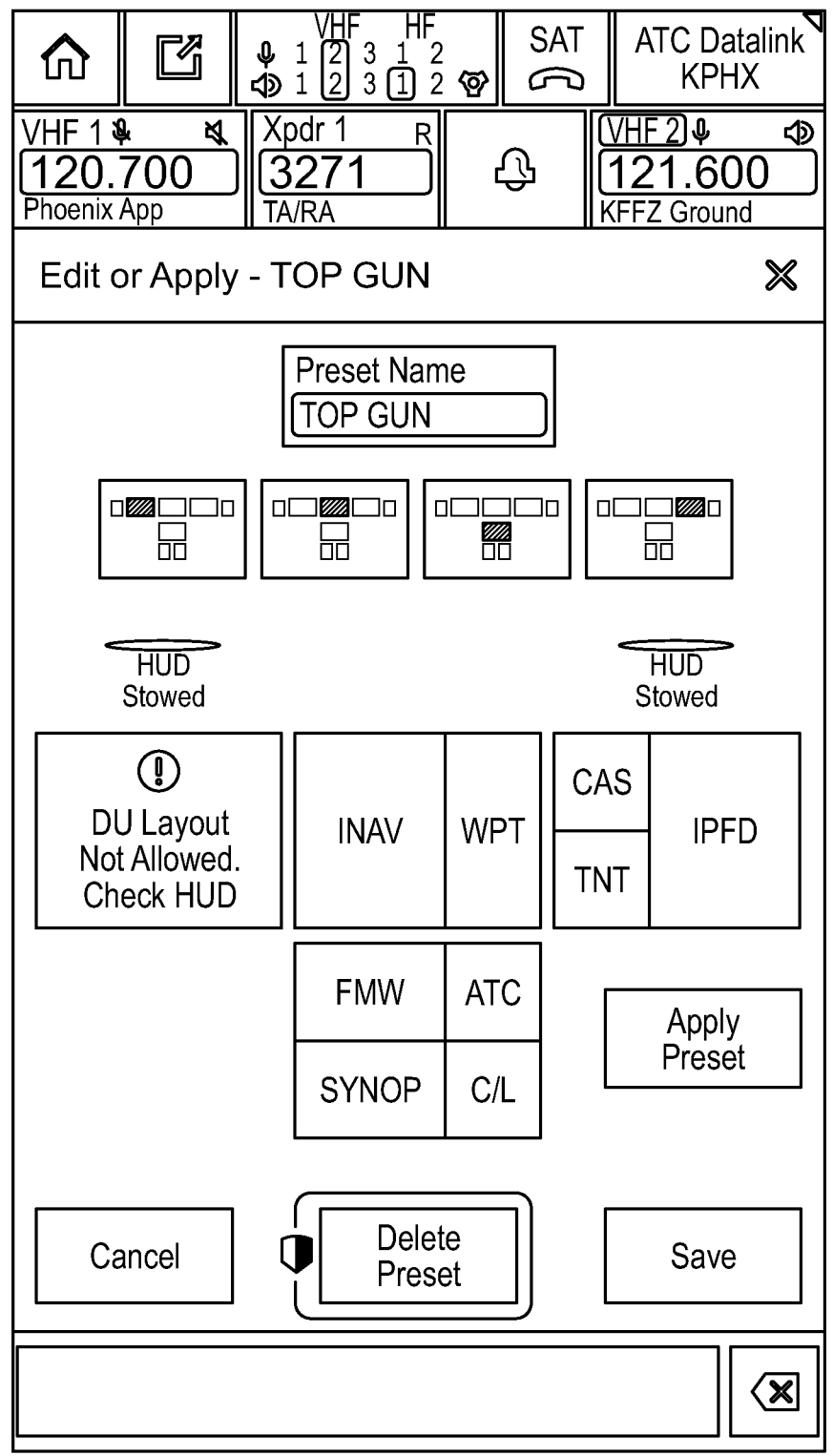
Figure 38:
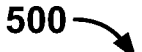
Figure 40:
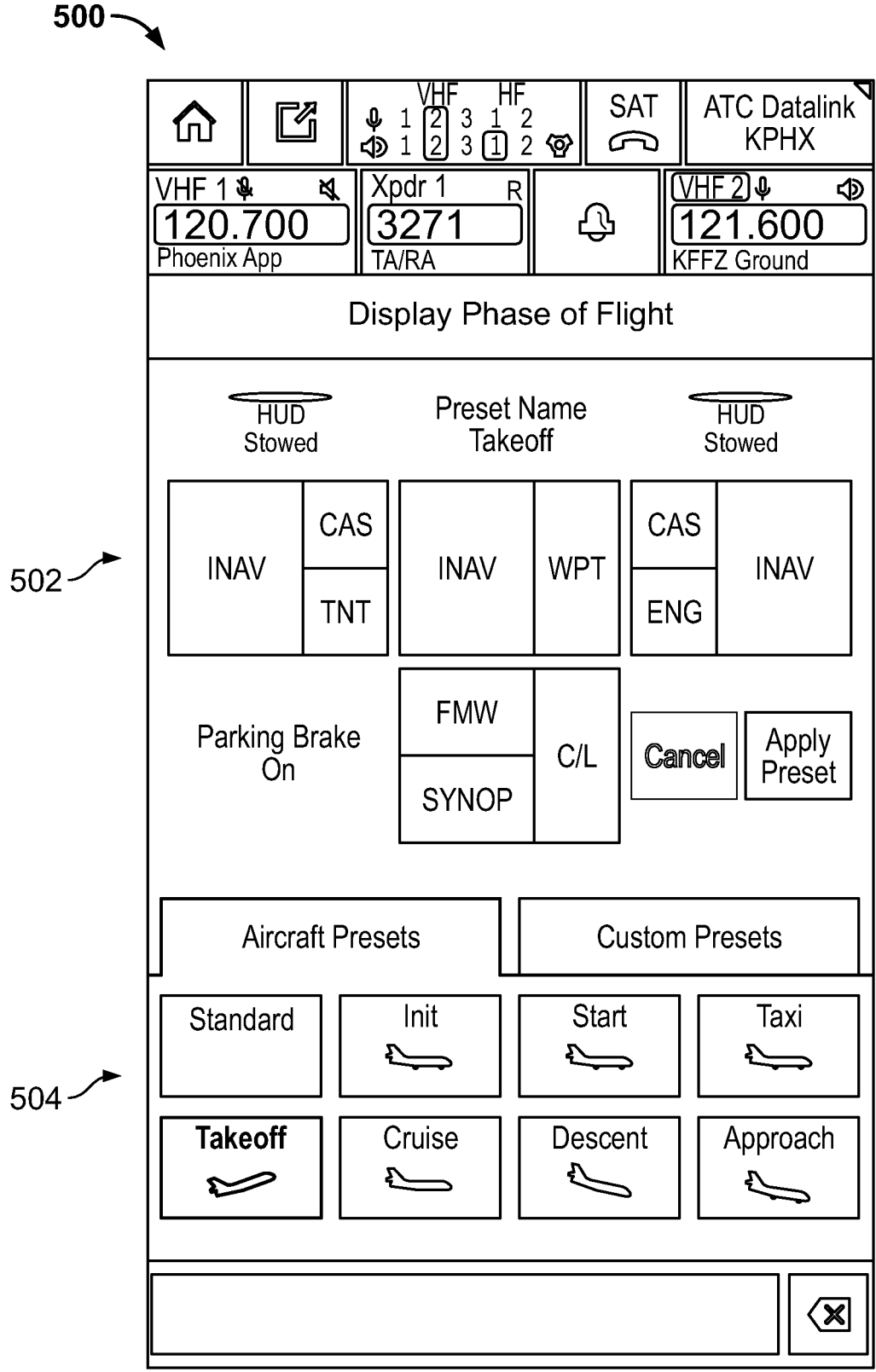
Figure 41:
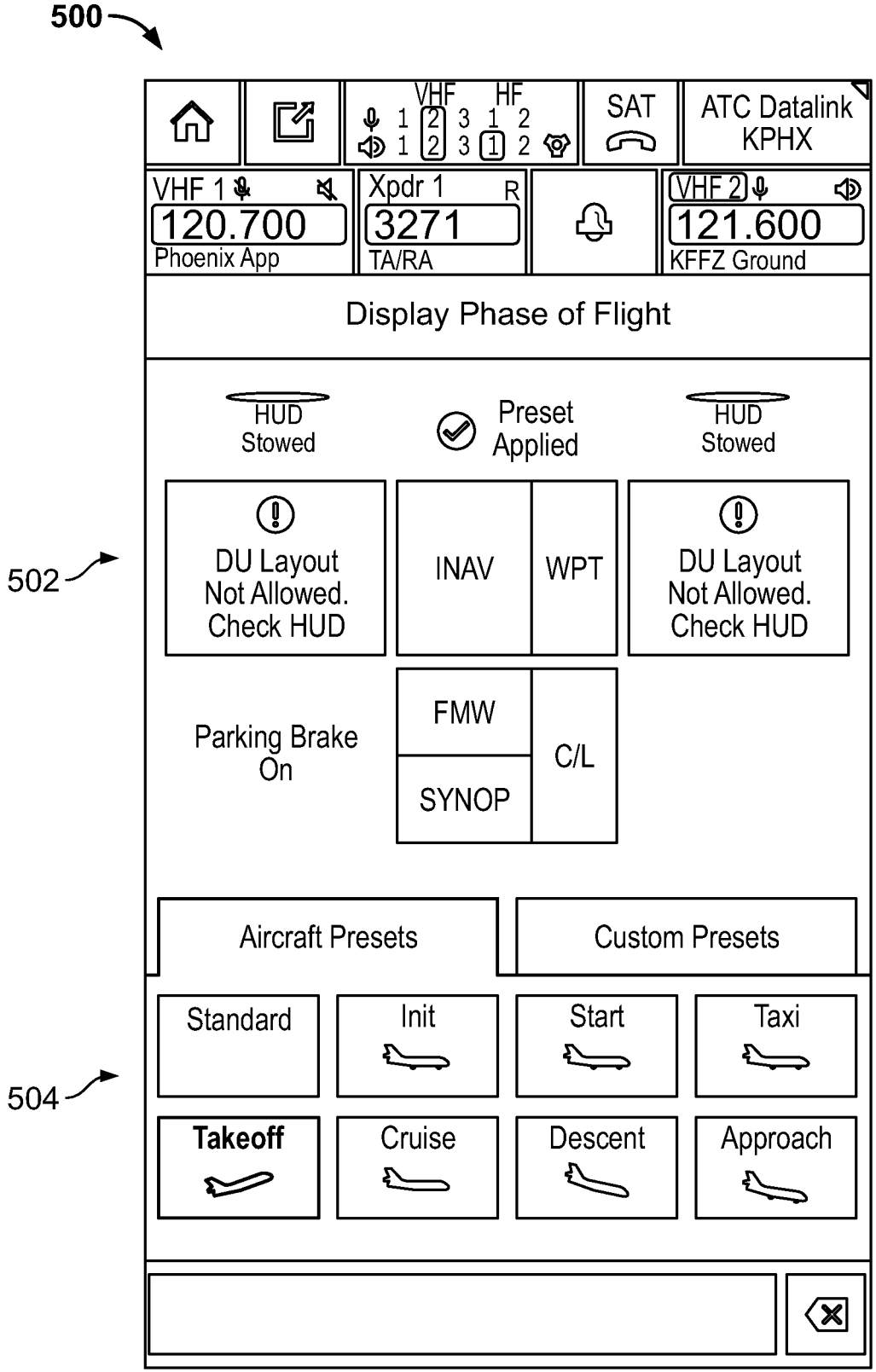
Figure 42:
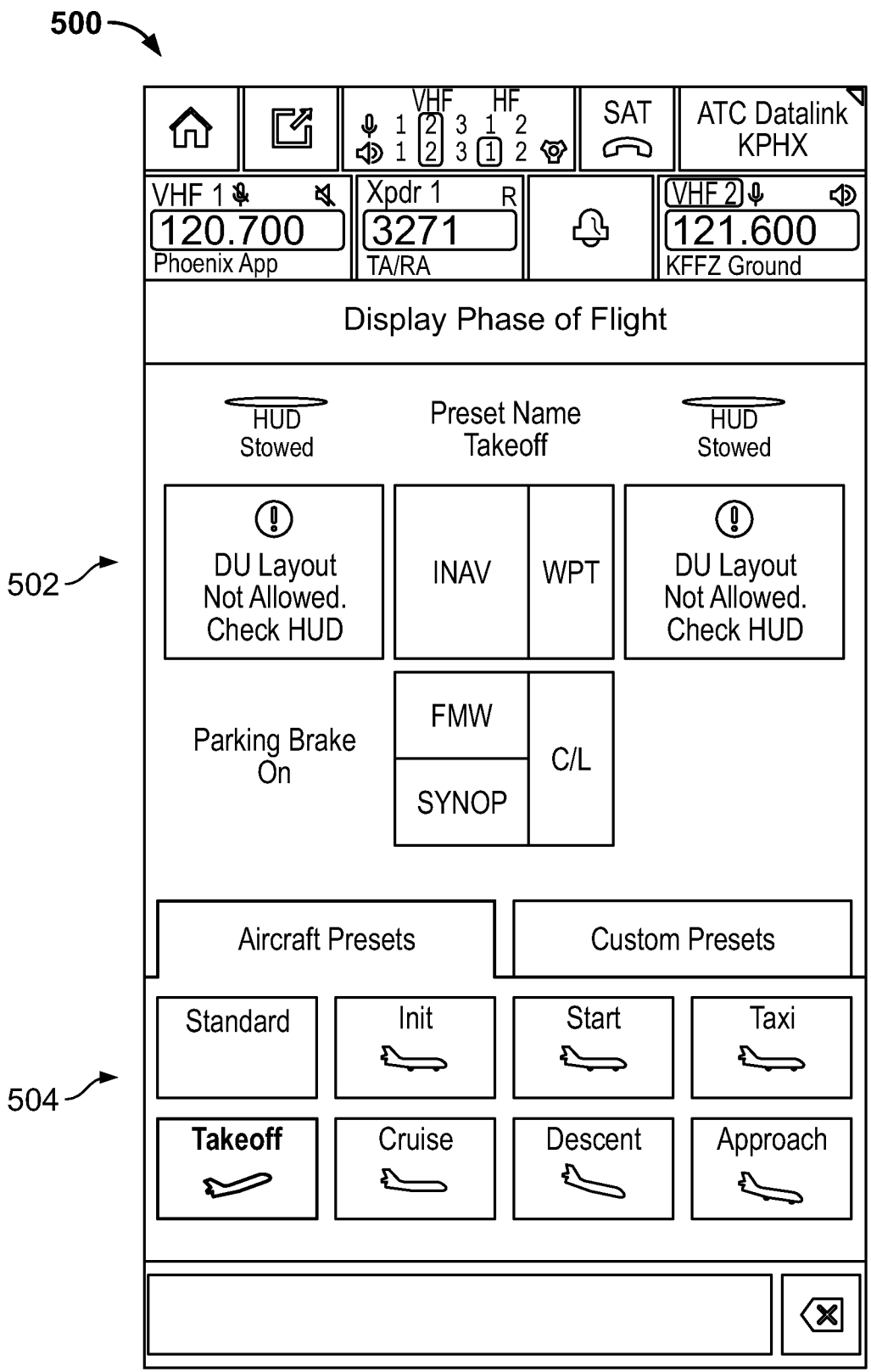
Figure 43:
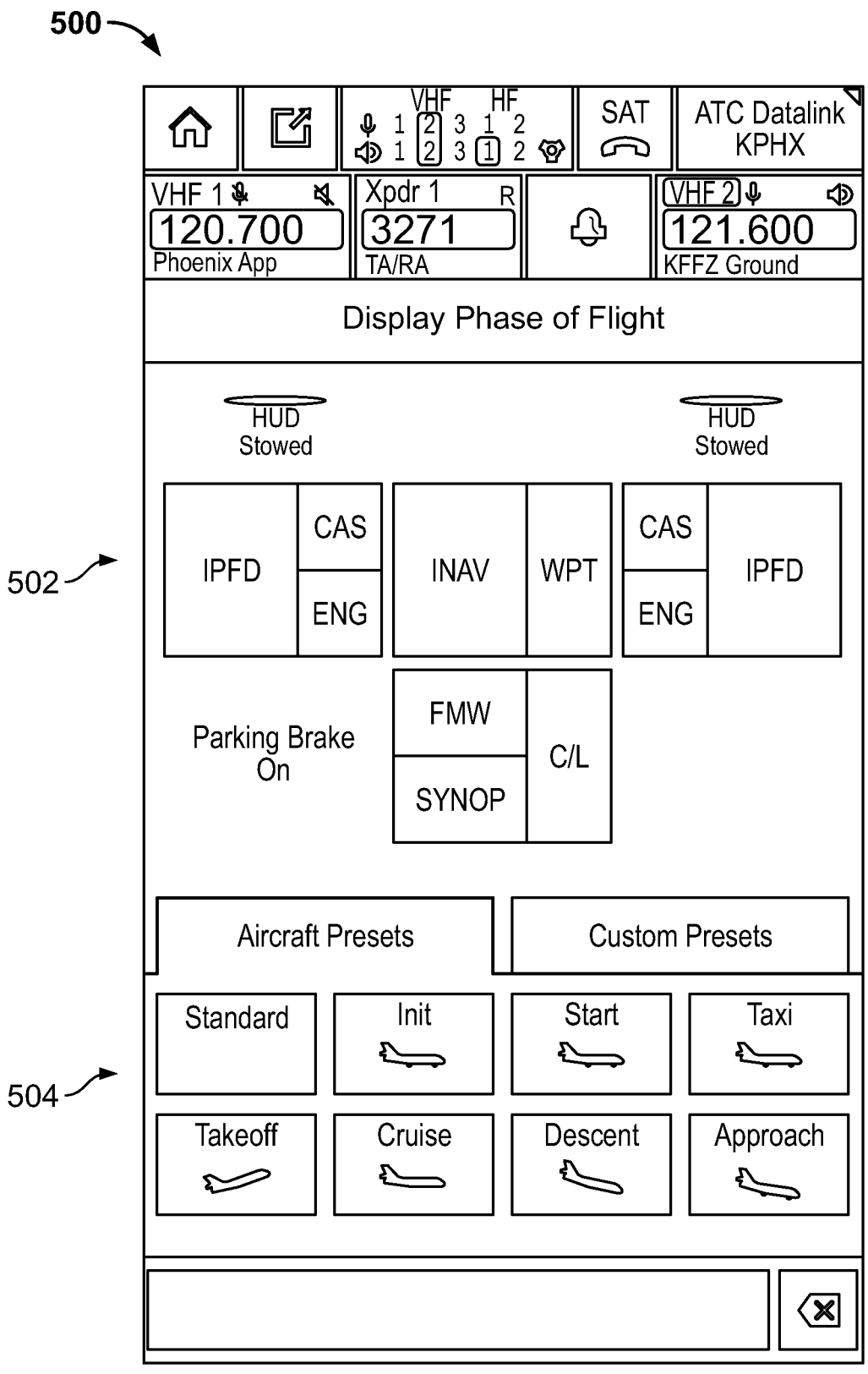
Figure 44:
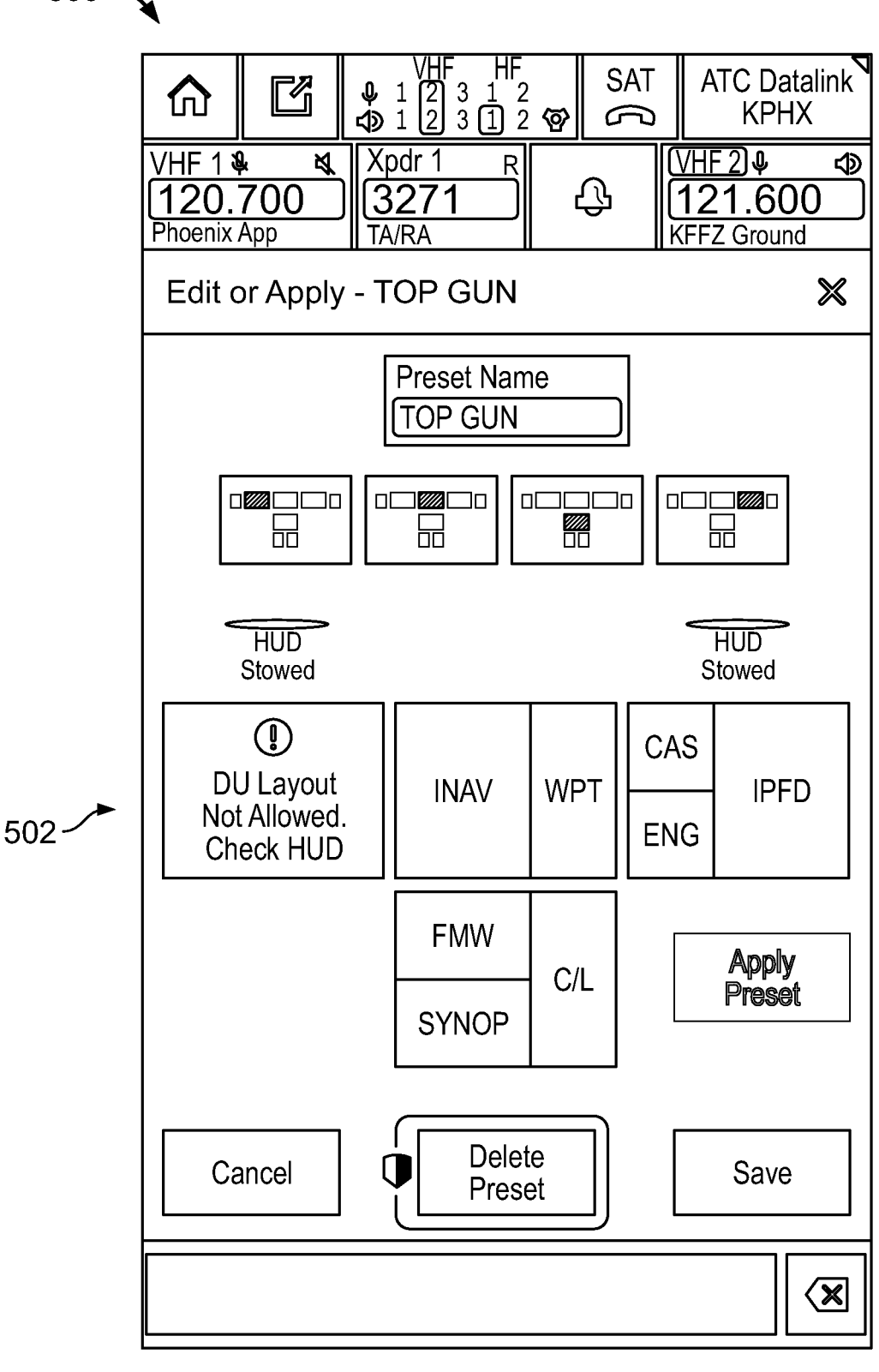
Figure 45:
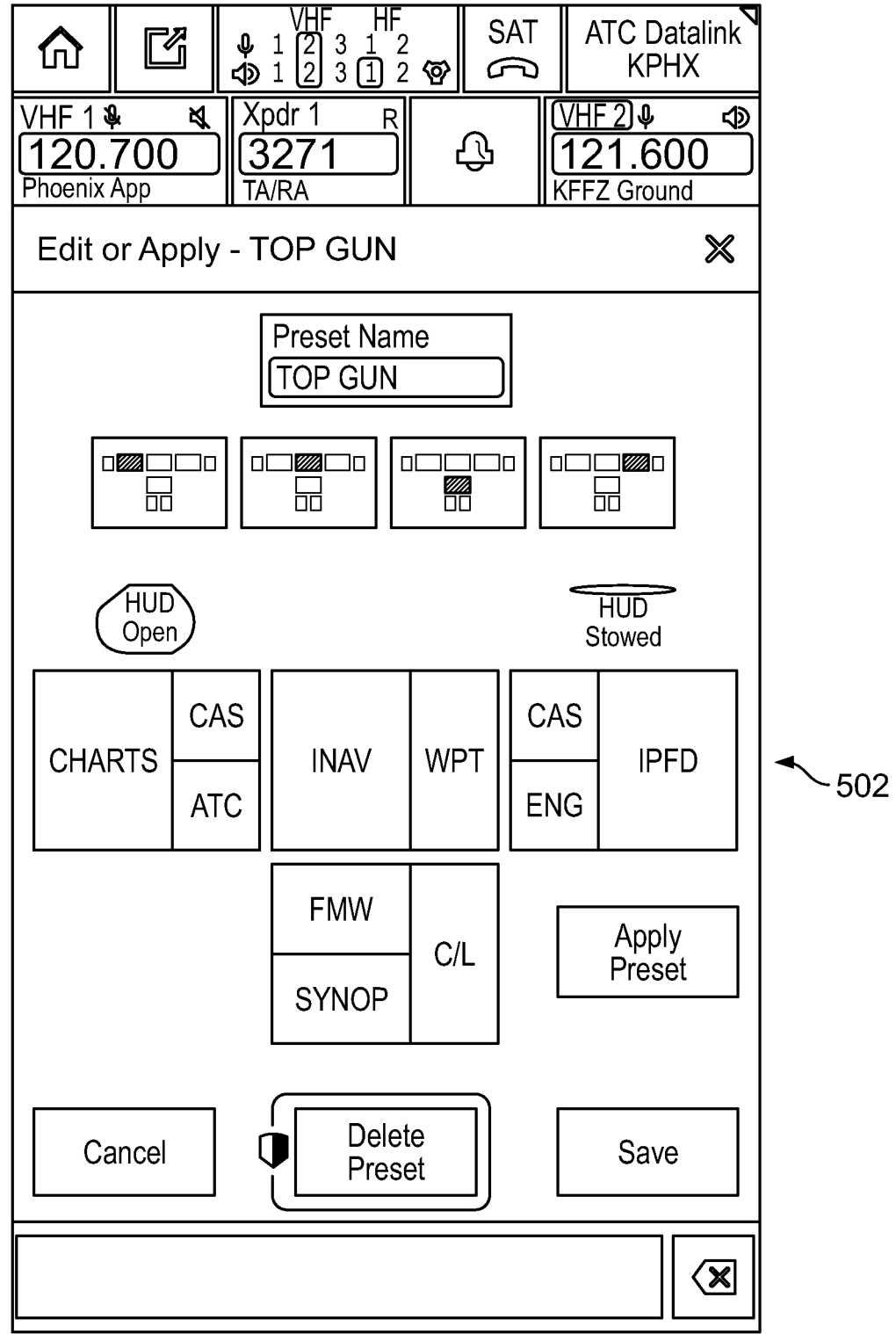

FIGS. 32-35 depict images that may be rendered when the flight crew edits and saves a customized preset 3202. In the depicted example, the display unit layout 502 was not allowed because the head-up display (HUD) was stowed (see FIG. 33). To address this error annunciation, the flight crew may open the HUD and apply the layout 502 (FIGS. 34-35).

FIGS. 36-39 depict images that may be rendered when the flight crew decides to delete a custom preset 3602 that was previously created.

FIGS. 40-45 depict images that may be rendered when the flight crew selects a preset (manufacturer (FIGS. 40-43) or customized (FIGS. 44-45) that is not allowed due to a constraint, such as the current HUD status, that is then subsequently corrected.

Figure 46:
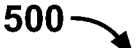
Figure 47:
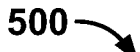

FIGS. 46-48 depict images that may be rendered when various devices, such as an HUD, a display unit, and/or aerospace graphics module (AGM), fail and/or are unavail-able.

Program aspects of the technology may be thought of as "products" or "articles of manufacture" typically in the form of executable code and/or associated data that is carried on or embodied in a type of machine-readable medium. "Stor-age" type media include any or all of the tangible memory of the computers, processors or the like, or associated modules thereof, such as various semiconductor memories, tape drives, disk drives and the like, which may provide non-transitory storage at any time for the software program-ming. All or portions of the software may at times be communicated through the Internet or various other tele-communication networks. Such communications, for example, may enable loading of the software from one computer or processor into another, for example, from a management server or host computer of the mobile com-munication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for determining display modules that are compatible with a display of an avionics system, the method comprising:

receiving, by one or more processors, a plurality of presets from a database, wherein each of the plurality of presets corresponds to a display unit configuration for an avionics display;

analyzing, by the one or more processors, each of the plurality of presets based on one or more constraints, wherein at least one of the one or more constraints includes a Heads-Up Display (HUD) status;

based on the analyzing, determining, by the one or more processors, at least one compatible preset of the plurality of presets; and displaying, by the one or more processors, the at least one compatible preset.

2. The computer-implemented method of claim 1, wherein the one or more constraints include at least one of: a regulatory constraint, a location constraint, an internal constraint, a system constraint, a parking brake constraint, or a Weight on Wheels (WOW) constraint.

3. The computer-implemented method of claim 1, wherein each of the plurality of presets corresponds to at least one phase of flight category, wherein the at least one phase of flight category includes a standard category, an initial category, a start category, a taxi category, a takeoff category, a cruise category, a descent category, an approach category, a departure category, or an arrival category.

4. The computer-implemented method of claim 1, the method comprising:

receiving, by the one or more processors, user selection of the at least one compatible preset from a user;

analyzing, by the one or more processors, the at least one compatible preset based on one or more updated constraints;

based on the analyzing, determining, by the one or more processors, that the at least one compatible preset is not compatible with the one or more updated constraints; and providing, by the one or more processors, a recommended preset to the user, where the recommended preset is compatible with the one or more updated constraints.

5. A computer system for determining display modules that are compatible with a display of an avionics system, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving a plurality of presets from a database, wherein each of the plurality of presets corresponds to a display unit configuration for an avionics display;

analyzing each of the plurality of presets based on one or more constraints, wherein at least one of the one or more constraints includes a Heads-Up Display (HUD) status;

based on the analyzing, determining at least one compatible preset of the plurality of presets; and displaying the at least one compatible preset.

6. The computer system of claim 5, wherein the one or more constraints include at least one of: a regulatory constraint, a location constraint, an internal constraint, a system constraint, a parking brake constraint, or a Weight on Wheels (WOW) constraint.

7. The computer system of claim 5, wherein each of the plurality of presets corresponds to at least one phase of flight category, wherein the at least one phase of flight category includes a standard category, an initial category, a start category, a taxi category, a takeoff category, a cruise category, a descent category, an approach category, a departure category, or an arrival category.

8. The system of claim 5, wherein the processor-readable instructions, which when executed by the one or more processors configures the one or more processors to additionally perform the functions of:

receiving user selection of the at least one compatible preset from a user;

analyzing the at least one compatible preset based on one or more updated constraints;

determining, based on the analyzing, that the at least one compatible preset is not compatible with the one or more updated constraints; and providing a recommended preset to the user, where the recommended preset is compatible with the one or more updated constraints.

9. A non-transitory computer-readable medium containing instructions for determining display modules that are compatible with a display of an avionics system, the instructions comprising:

receiving a plurality of presets from a database, wherein each of the plurality of presets corresponds to a display unit configuration for an avionics display;

analyzing each of the plurality of presets based on one or more constraints, wherein at least one of the one or more constraints includes a Heads-Up Display (HUD) status;

based on the analyzing, determining at least one compatible preset of the plurality of presets; and displaying the at least one compatible preset.

10. The non-transitory computer-readable medium of claim 9, wherein the one or more constraints include at least one of: a regulatory constraint, a location constraint, an internal constraint, a system constraint, a parking brake constraint, or a Weight on Wheels (WOW) constraint.

11. The non-transitory computer-readable medium of claim 9, wherein each of the plurality of presets corresponds to at least one phase of flight category, wherein the at least one phase of flight category includes a standard category, an initial category, a start category, a taxi category, a takeoff category, a cruise category, a descent category, an approach category, a departure category, or an arrival category.

12. The non-transitory computer-readable medium of claim 9, wherein the instructions further comprise:

receiving user selection of the at least one compatible preset from a user;

analyzing the at least one compatible preset based on one or more updated constraints;

based on the analyzing, determining that the at least one compatible preset is not compatible with the one or more updated constraints; and providing a recommended preset to the user, where the recommended preset is compatible with the one or more updated constraints.

* * * * *